US009825419B2

(12) United States Patent
Hori et al.

(10) Patent No.: US 9,825,419 B2
(45) Date of Patent: Nov. 21, 2017

(54) MULTI-WAVELENGTH, ULTRASHORT PULSE GENERATION AND DELIVERY, WITH APPLICATIONS IN MICROSCOPY

(71) Applicant: IMRA America, Inc., Ann Arbor, MI (US)

(72) Inventors: Takashi Hori, Ann Arbor, MI (US); Martin E. Fermann, Dexter, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

(21) Appl. No.: 15/245,082

(22) Filed: Aug. 23, 2016

(65) Prior Publication Data

US 2016/0365697 A1    Dec. 15, 2016

Related U.S. Application Data

(63) Continuation of application No. PCT/US2015/017245, filed on Feb. 24, 2015.
(Continued)

(51) Int. Cl.
*H01S 3/00* (2006.01)
*H01S 3/067* (2006.01)
(Continued)

(52) U.S. Cl.
CPC .......... *H01S 3/06758* (2013.01); *G02F 1/39* (2013.01); *H01S 3/0057* (2013.01);
(Continued)

(58) Field of Classification Search
CPC .......................... H01S 3/06758; H01S 3/0057
See application file for complete search history.

(56) References Cited

U.S. PATENT DOCUMENTS

| 4,655,547 A | 4/1987 | Heritage |
| 4,685,107 A | 8/1987 | Kafka |

(Continued)

FOREIGN PATENT DOCUMENTS

| DE | 69013265 T2 | 5/1995 |
| DE | 29609850 U1 | 8/1996 |

(Continued)

OTHER PUBLICATIONS

Sherlock et al. "Tunable fibre-coupled multiphoton microscopy with a negative curvature fibre", Journal of Biophotonics vol. 9.7, pp. 715-720 (Jul. 2016).*

(Continued)

*Primary Examiner* — Eric Bolda
(74) *Attorney, Agent, or Firm* — Knobbe, Martens, Olson & Bear, LLP

(57) ABSTRACT

In one aspect, the present disclosure describes a fiber laser system for the generation and delivery of femtosecond (fs) pulses in multiple wavelength ranges. For improved versatility in multi-photon microscopy, an example of a dual wavelength fiber system based on Nd fiber source providing gain at 920 and 1060 nm is described. An example of a three-wavelength system is included providing outputs at 780 nm, 940 nm, and 1050 nm. The systems include dispersion compensation so that high quality fs pulses are provided for applications in microscopy, for example in multiphoton microscope (MPM) systems.

25 Claims, 15 Drawing Sheets

Related U.S. Application Data

(60) Provisional application No. 61/946,093, filed on Feb. 28, 2014.

(51) Int. Cl.
| | |
|---|---|
| *G02F 1/39* | (2006.01) |
| *H01S 3/11* | (2006.01) |
| *H01S 3/16* | (2006.01) |
| *H01S 3/30* | (2006.01) |

(52) U.S. Cl.
CPC .......... *H01S 3/0085* (2013.01); *H01S 3/0092* (2013.01); *H01S 3/06708* (2013.01); *H01S 3/1106* (2013.01); *H01S 3/1608* (2013.01); *H01S 3/1611* (2013.01); *H01S 3/1616* (2013.01); *H01S 3/1618* (2013.01); *H01S 3/302* (2013.01); *G02F 2001/392* (2013.01); *H01S 3/005* (2013.01); *H01S 2301/08* (2013.01); *H01S 2301/085* (2013.01)

(56) References Cited

U.S. PATENT DOCUMENTS

| | | | |
|---|---|---|---|
| 4,835,778 | A | 5/1989 | Kafka |
| 4,918,751 | A | 4/1990 | Pessot |
| 4,928,316 | A | 5/1990 | Heritage |
| 5,034,613 | A | 7/1991 | Denk |
| 5,084,617 | A | 1/1992 | Gergely |
| 5,101,456 | A | 3/1992 | Islam |
| 5,119,385 | A | 6/1992 | Aoshima |
| 5,132,526 | A | 7/1992 | Iwasaki |
| 5,161,053 | A | 11/1992 | Dabbs |
| 5,202,744 | A | 4/1993 | Louis |
| 5,329,398 | A | 7/1994 | Lai |
| 5,349,591 | A | 9/1994 | Weston |
| 5,499,134 | A | 3/1996 | Galvanauskas |
| 5,513,194 | A | 4/1996 | Tamura |
| 5,541,947 | A | 7/1996 | Mourou |
| 5,587,827 | A | 12/1996 | Hakimi |
| 5,696,782 | A | 12/1997 | Harter |
| 5,862,287 | A | 1/1999 | Stock et al. |
| 5,880,877 | A | 3/1999 | Fermann et al. |
| 5,995,281 | A | 11/1999 | Simon |
| 6,178,041 | B1 | 1/2001 | Simon |
| 6,236,779 | B1 | 5/2001 | Kafka et al. |
| 6,249,630 | B1 | 6/2001 | Stock et al. |
| 6,269,206 | B1 | 7/2001 | Simon |
| 6,389,198 | B2 | 5/2002 | Kafka et al. |
| 6,826,209 | B1 * | 11/2004 | Morita .................. H01S 3/0057 372/101 |
| 6,885,683 | B1 | 4/2005 | Fermann et al. |
| 7,257,302 | B2 | 8/2007 | Fermann et al. |
| 7,894,131 | B2 * | 2/2011 | Kubo ................. G02B 21/0032 359/385 |
| 8,040,929 | B2 | 10/2011 | Imeshev et al. |
| 8,610,086 | B2 | 12/2013 | Wolleschensky et al. |
| 2007/0290145 | A1 | 12/2007 | Viellerobe et al. |
| 2008/0112709 | A1 | 5/2008 | Oulianov et al. |
| 2012/0195330 | A1 | 8/2012 | Cho et al. |
| 2013/0083816 | A1 | 4/2013 | Kubo |
| 2014/0023993 | A1 | 1/2014 | Zeng et al. |

FOREIGN PATENT DOCUMENTS

| | | |
|---|---|---|
| DE | 19619983 A1 | 11/1996 |
| DE | 19622359 B4 | 11/2007 |
| EP | 1959292 A2 | 8/2008 |
| EP | 2458750 A2 | 5/2012 |
| JP | 4336787 | 9/2009 |
| WO | WO 92/19930 A1 | 11/1992 |
| WO | WO 2015/112448 A1 | 7/2015 |
| WO | WO 2015/130651 A1 | 9/2015 |

OTHER PUBLICATIONS

Fermann et al., "Linear Pulse Propagation in Optical Fibers", Ultrafast lasers—Technology and Applications, eds. M.E. Fermann, et al., Marcel Dekker, Inc., Jan. 2003, pp. 92-99.
Heckl et al., "Temporal pulse compression in a xenon-filled Kagome-type hollow-core photonic crystal fiber at high average power", Optics Express, vol. 19, No. 20, Sep. 26, 2011, in 8 pages.
Leica Microsystems, "Multiphoton Microscopy", http://w3.biosci.utexas.edu/pmc/webdocs/Multiphoton.pdf, Feb. 2012 in 59 pages.
Leica Microsystems, "Leica TCS MP5 Brochure", Nov. 2011, in 12 pages.
International Search Report and Written Opinion in corresponding International Patent Application No. PCT/US2015/017245, mailed Jun. 26, 2015, in 15 pages.
International Preliminary Report on Patentability in corresponding International Patent Application No. PCT/US2015/017245, mailed Sep. 15, 2016, in 12 pages.
G. J. Brakenhoff et al.: Femtosecond pulse width control in microscopy by two-photon absorption autocorrelation, Journal of Microscopy, vol. 179, Pt 3, Sep. 1995, pp. 253-260.
M. E. Fermann et al.: Generation of pulses shorter than 200 fs from a passively mode-locked Er fiber laser, Optics Letters, vol. 18, No. 1, Jan. 1, 1993, pp. 48-50.
R. L. Fork et al.: Compression of optical pulses to six femtoseconds by using cubic phase compensation, Optics Letters, vol. 12, No. 7, Jul. 1987, pp. 483-485.
H.A. Haus Et al.: Additive-Pulse Modelocking in Fiber Lasers, IEEE Journal of Quantum Electronics, vol. 30, No. 1, Jan. 1994, pp. 200-208.
M. Hofer et al.: Regenerative Nd:glass amplifier seeded with a Nd:fiber laser, Optics Letters, vol. 17, No. 11, Jun. 1, 1992, pp. 807-809.
J. D. Kafka et al.: Mode-locked erbium-doped fiber laser with soliton pulse shaping, Optics Letters, vol. 14, No. 22, Nov. 15, 1989, pp. 1269-1271.
S. Smith et al.: 100 femtosecond / 100 nanometer near-field probe, Ultramicroscopy 57(1995), Jan. 1995, pp. 173-175.
J. B. Stark et al.: Ultrafast near-field optical probing, in: Quantum Electronics and Laser Science Conference (QELS '95), Baltimore, May 21-26, 1995, S. 82-84.
K. Tamura et al: Self-starting additive pulse mode-locked erbium fibre ring laser, Electronics Letters, Nov. 19, 1992, vol. 28, No. 24, pp. 2226-2228.
K. Tamura et al.: 77-fs pulse generation from a stretched-pulse mode-locked all-fiber ring laser, Optics Letters, vol. 18, No. 13, Jul. 1, 1993, pp. 1080-1082.
K. Tamura et al.: Unidirectional ring resonators for self-starting passively mode-locked lasers, Optics Letters, vol. 18, No. 3, Feb. 1, 1993, pp. 220-222.
K. Tamura et al.: Technique for obtaining high-energy ultrashort pulses from an additive-pulse mode-locked erbium-doped fiber ring laser, Optics Letters, vol. 19, No. 1, Jan. 1, 1994, pp. 46-48.
K. Tamura et al.: Soliton versus nonsoliton operation of fiber ring lasers, Applied Physics Letters, 64(2), Jan. 10, 1994, pp. 149-151.
M. Lai et al.: Single-grating laser pulse stretcher and compressor, Applied Optics, vol. 33, No. 30, Oct. 20, 1993, pp. 6985-6987.
Y. Beaudoin et al.: Ultrahigh-contrast Ti:sapphire/Nd:glass terawatt laser system, Optics Letters, vol. 17, No. 12, Jun. 15, 1992, pp. 865-867.

* cited by examiner

MULTI-WAVELENGTH, ULTRASHORT PULSE GENERATION AND DELIVERY, WITH APPLICATIONS IN MICROSCOPY

CROSS REFERENCE TO RELATED APPLICATIONS

This application is a continuation of international application no. PCT/US2015/017245, filed Feb. 24, 2015, entitled "MULTI-WAVELENGTH, ULTRASHORT PULSE GENERATION AND DELIVERY, WITH APPLICATIONS IN MICROSCOPY," which claims the benefit of priority to U.S. Patent Application No. 61/946,093, filed Feb. 28, 2014, entitled "MULTI-WAVELENGTH, ULTRASHORT PULSE GENERATION AND DELIVERY, WITH APPLICATIONS IN MICROSCOPY;" each of the foregoing applications is hereby incorporated by reference herein in its entirety.

FIELD

The disclosure relates to compact, fiber delivered ultrashort pulse light sources and examples of applications thereof.

BACKGROUND

Delivery of laser light through optical fibers or waveguide is an attractive way to direct laser energy to a point of interest in an eye safe fashion. Related applications of ultrashort lasers include, but are not limited to, laser surgery and multiphoton microscopy.

Fiber delivered ultrashort pulse light sources in the near IR (infrared) have many applications in medical imaging and multi-photon microscopy. For medical applications such sources need to be highly robust, have long term stability, and also comprise a minimal component count with a high degree of optical integration. Solid state and fiber laser based near IR light sources are commonly used. For applications in a clinical environment the robustness of fiber laser based ultrashort pulse sources is generally preferred, however.

Regarding two-photon microscopy, currently available systems are based on a certain set of fluorophores, which are typically excited at wavelengths near 800 nm, 920 nm, 1050 nm, 1300 nm and 1700 nm. Wavelengths of 1050 nm and 800 nm can for example be obtained from ytterbium (Yb) fiber lasers or frequency doubled erbium (Er) fiber lasers respectively. Wavelengths of 1700 nm can be obtained from Raman shifting of Er fiber lasers in optical fibers. However, no viable commercial solution for the generation of high power femtosecond pulses in the 920 and 1300 nm wavelength windows has yet been demonstrated, particularly when combined with fiber delivery.

For applications in two-photon confocal microscopy, in the absence of damage and photo-bleaching constraints, it is useful to maximize the number M of photons excited by two photon excitation. As is well known M can be shown to be proportional to $M = \text{const} \times \bar{P}^2 / f\tau$, where $\bar{P}$ is the average laser power, f is the repetition frequency of the pulse train and $\tau$ is the pulse width. The typical average power required for two photon microscopy is in the range of 100 mW-1 W for pulse sources with repetition rates of around 100 MHz.

SUMMARY

One aspect the present disclosure features a fiber laser system for generation and delivery of femtosecond (fs) pulses in the 920 and 1300 nm wavelength ranges. For the wavelength range of 920 nm pulses generated with a fs seed (fs input) source are amplified in neodymium (Nd) fiber amplifier stage(s), where appropriate measures (such as optical filters or the use of large core fibers) are implemented to suppress gain depletion due to amplified spontaneous emission near 1060 nm. The 920 nm seed sources can be based on passively mode locked Nd fiber laser oscillators or frequency shifted fiber lasers.

In at least one implementation a wavelength in the 1.3 µm (1300 nm) spectral range can be obtained via difference frequency mixing of a frequency doubled Er fiber laser emitting at 780 nm with a thulium (Tm) fiber laser operating at 1.9 µm. Raman shifting of a Tm or holmium (Ho) fiber laser in a fluoride fiber to 2.6 µm and subsequent frequency doubling can also be implemented. In some embodiments optical parametric amplification (OPA) may be utilized, which further allows for a wavelength tunable source.

For improved versatility in multi-photon microscopy, a dual wavelength fiber system based on an Nd fiber amplifier providing gain at 920 and 1060 nm is described. In some implementations three or more output wavelengths may be provided, for example, 920 nm, 1060 nm, and 1300 nm.

In various implementations fiber delivery is provided using holey fibers, photonic crystal fibers and/or Kagome fibers.

BRIEF DESCRIPTION OF THE DRAWINGS

FIG. 8A shows the variation in pulse width as a function of the length of positive dispersion fiber, configured with $D(\lambda)>0$. FIG. 8B shows the measured spectrum, $\Delta\lambda \sim 17.5$ nm at $\lambda_c \sim 926.5$ nm. FIG. 8C shows the pulse temporal shape obtained via an autocorrelation measurement. FIG. 8D illustrates the $M^2$ obtained at outputs of the delivery fiber, $M^2_x \sim 1.32$, $M^2_y \sim 1.34$.

FIG. 9A is a plot illustrating dispersion characteristics of a hollow core (HC) fiber available from GLO Photonics SAS ('GLO', Limoges, France). The fiber loss is shown as the dashed curve and the fiber dispersion $D(\lambda)$ is shown as the solid curve. FIG. 9B is a plot illustrating the dispersion characteristics of a Kagome fiber available from and modeled by GLO.

Unless the context indicates otherwise, like reference numerals refer to like elements in the drawings.

DETAILED DESCRIPTION

Figure 1A:
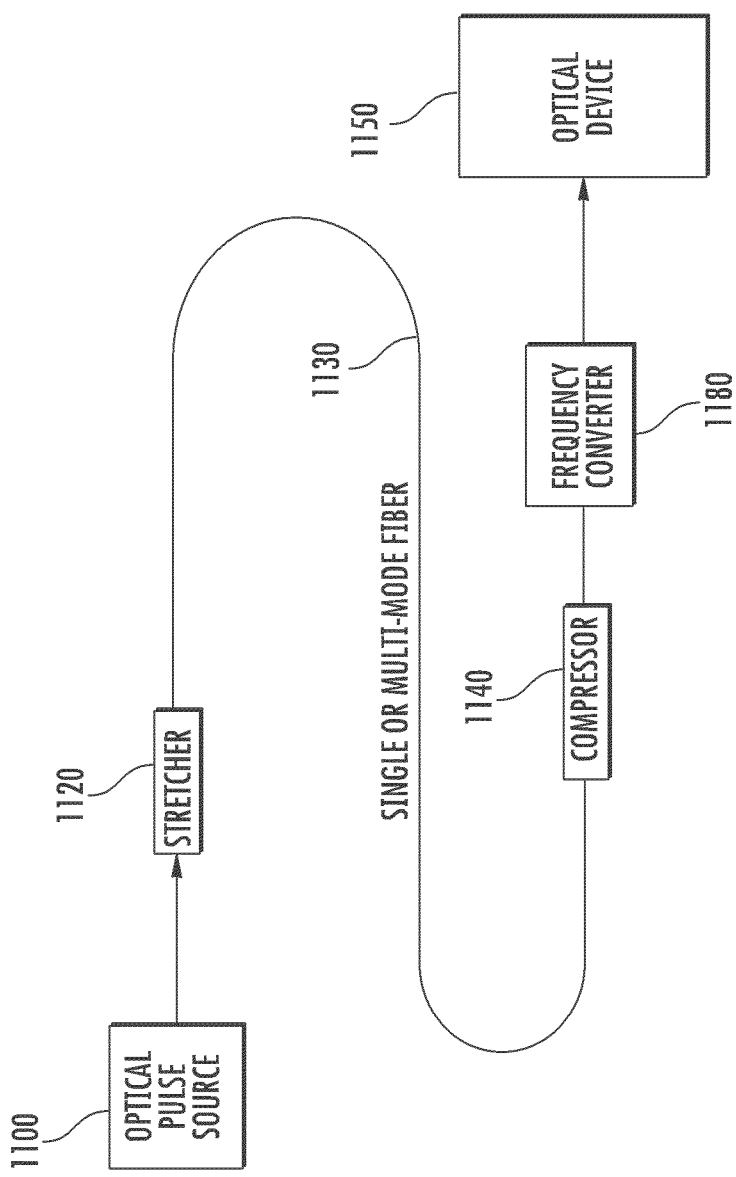
FIG. 1A schematically illustrates some components of a prior system for delivery of dispersion compensated pulses suitable for use in laser based microscopy.

As used herein, and unless otherwise stated, the term dispersion refers to second-order dispersion or group velocity dispersion commonly used in the field of ultrashort pulse optics, denoted herein as $\delta_2$. For example, discussion of dispersion effects and pulse propagation in optical fibers is found in 'Ultrafast Lasers'. In some disclosures group delay dispersion (GDD) is used as an equivalent defining term. Hence positive dispersion and negative dispersion, as used herein, refer to normal and anomalous dispersion, respectively. As an example, standard optical components exhibit normal dispersion at wavelengths in the visible and near IR region, whereas Er doped fibers exhibit anomalous dispersion at a 1.56 μm wavelength. In contrast to the above definition, a dispersion value denoted by $D(\lambda)$, refers to the dispersion as conventionally used in fiber optic communications and certain optical texts, given by $D(\lambda)=-(2\pi c/\lambda^2) \cdot (d^2k/d\omega^2)$, where k is the wave number, and $d^2k/d\omega^2=\beta_2$ is the group velocity dispersion parameter. Accordingly, with respect to any particular embodiment, a person of ordinary skill in the art would understand which measure of dispersion is being referred to and could readily convert from one measure of dispersion to another measure of dispersion (e.g., from group velocity dispersion $\delta_2$ to or from $D(\lambda)$).

The delivery of femtosecond (fs) pulses through optical fibers has for example been discussed in U.S. Pat. No. 7,257,302, 'In-line, high energy fiber chirped pulse amplification system'. Optical fibers that can deliver ultra-short pulses in near-diffraction-limited beams in the near infrared spectral region are particularly interesting for nonlinear imaging applications as discussed in U.S. Pat. No. 5,880,877, 'Apparatus and method for the generation of high-power femtosecond pulses from a fiber amplifier'.

Fiber delivery systems for ultrashort pulses have previously been also discussed in U.S. Pat. Nos. 5,862,287 and 6,249,630 to Stock et al. and later in U.S. Pat. Nos. 6,236,779 and 6,389,198 to Kafka et al. In a particularly useful implementation, the optical pulses can be coupled into low-nonlinearity holey or photonic bandgap pulse delivery fibers, providing for guided propagation via holes surrounding a fiber core or even providing for guided propagation predominantly inside an air-hole as well known in the state of the art. Dispersive optical components (DOC) upstream of the delivery fiber can compensate for the dispersion of the delivery fiber and ensure that a minimal pulse width is obtained at the output of the delivery fiber or on a target located downstream of the delivery fiber.

The '779/'198 patents did not disclose a method or arrangement to compensate for the dispersion of the photonic bandgap delivery fiber. A holey or photonic bandgap fiber can also be engineered to provide correct dispersion for use as a pulse compressor or partial pulse compressor to compress a stretched pulse. Such pulse compressor and partial pulse compressor functions of the holey or photonic bandgap fibers can be used in combination with the power delivery function of the same fibers.

Fiber lasers as compact sources of wavelength tunable pulses have for example been discussed in U.S. Pat. No. 8,040,929 to Imeshev et al. based on optical parametric amplification (OPA). Appropriate signal and pump frequencies for OPA can for example be derived from high power fiber pulse sources, where a fraction of the output at the pump frequency can be directed to a highly nonlinear fiber for frequency broadening and the generation of a seed signal at a selectable and tunable seed frequency.

The following U.S. Patents, Patent Publication, and International Patent Application are hereby incorporated by reference in their entirety: U.S. Pat. No. 5,862,287 ('287) and U.S. Pat. No. 6,249,630, ('630), 'Apparatus and method for delivery of dispersion-compensated ultrashort optical pulses with high peak power; U.S. Pat. No. 5,880,877 ('877), "Apparatus and method for the generation of high-power femtosecond pulses from a fiber amplifier"; U.S. Pat. No. 6,885,683, ('683), 'Modular, high energy, widely-tunable ultrafast fiber source', Fermann et al.; U.S. Pat. No. 7,257,302 ('302), In-line, high energy fiber chirped pulse amplification system'; U.S. Pat. No. 8,040,929, ('929), 'Optical parametric amplification, optical parametric generation, and optical pumping in optical fibers systems', Imeshev et al.; U.S. Patent Application Pub. No. 2012/0195330 ('330), 'Methods and systems for fiber delivery of high peak power optical pulses'; and International PCT Application No. PCT/US2015/011802, ('802), "Methods and systems for high speed laser surgery", filed Jan. 16, 2015.

FIG. 1A schematically illustrates some components of a prior system for delivery of dispersion compensated pulses suitable for use in laser based microscopy, disclosed in '630. In this example, an optical pulse source 1100 generates optical pulses. The optical pulse source 1100 can be, for example, a passively modelocked fiber laser, and may include an oscillator and an amplifier. In '630 an Erbium fiber laser source was discussed, as well as various other pulsed laser sources. Optical pulses are introduced from the optical pulse source 1100 to a pulse stretcher 1120. The pulse stretcher 1120 may comprise any of the following: an optical fiber, chirped optical fiber Bragg gratings, a diffraction grating pair, or a prism pair. Alternatively, stretched pulses may be generated by the source 1100 itself. The pulse stretcher 1120 extends the pulse width of the incident optical pulses, forming chirped optical pulses. Due to the extension of the pulse width, the peak power of the optical pulses is reduced. The stretched optical pulses are then transmitted through a fiber 1130 which delivers the optical pulses to a desired location. One particularly attractive case for using multimode fiber in delivery (using either passive or active (amplifier) fiber) is the case when the lowest order mode is excited in a multimode fiber. This takes advantage of the larger effective mode-field diameter, allowing for higher peak power delivery due to lower non-linear effects, while avoiding the modal dispersion problem from the transmission of several modes through the fiber. In some embodiments a polarization-maintaining multi-mode fiber (PM), may be implemented.

As further disclosed in '630, the optical fiber and/or an output unit coupled to the end of the optical fiber introduces a dispersion which compensates for the dispersion introduced by the pulsed laser source and the stretcher, and delivers a recompressed optical pulse to an optical device. The optical fiber delivery system preferably pre-compensates, sometimes referred to as pre-chirping, for the dispersion introduced by optical components within the optical device, so that the optical pulses are fully recompressed at a point of interest within the optical device, such as at a specimen or at a detector. A compressor 1140 operates to compress the pulse width of the optical pulses which have been transmitted through the fiber 1130. The compressor may be one or more of an optical fiber, a diffraction grating pair, chirped mirrors, chirped optical fiber Bragg gratings, or a prism pair. One possibility is that optical fiber 1130 itself provides the compressor, in whole or part. In the case of compensation through to a point within the optical device 1150 the chirp (e.g., dispersion) within the length of single-mode fiber 1130 and through the optical device 1150 must be equal and opposite to that incident on fiber 1130 (e.g., equal and opposite to the chirp introduced by the optical pulse source and/or pulse stretcher). The optical fiber delivery system may include a frequency converter 1180 either before or after the delivery optical fiber. The frequency converter allows optical pulses having frequencies other than that generated by the laser source to be delivered to the optical device in an efficient manner.

Figure 1B:
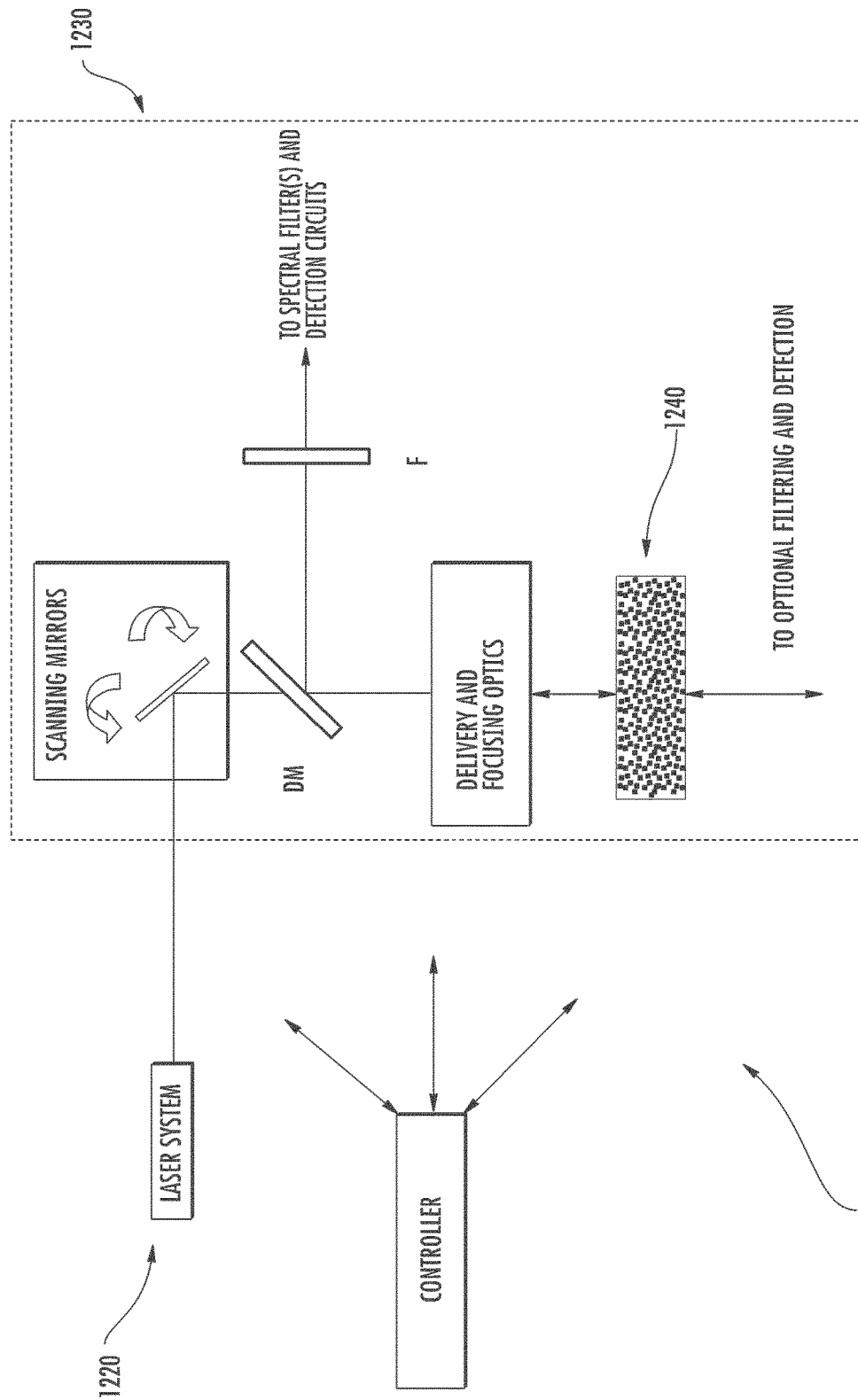
FIG. 1B schematically illustrates several components of an example system for multiphoton microscopy, the system receiving ultrashort pulses transmitted via a delivery fiber.

FIG. 1B schematically illustrates several components of a system 1200 for multiphoton microscopy. A multiphoton microscope (MPM) 1230 receives input pulses from laser system 1220 transmitted via a delivery fiber (not shown) which may be supplied with the laser system. The MPM 1230 includes an optical scanner which in this example includes X-Y galvanometer scanning mirrors. Other arrangements may be utilized if compatible with imaging application requirements, for example an acousto-optic scanner may be used for high speed scanning in a first direction and a galvanometer based mirror for scanning in a second direction, e.g.: video rate scanner. The scanning beam is focused and delivered to the sample 1240. In this example an optical system is shown to receive emissions along a direction opposite to the laser incident direction, but it is to be understood that it may be desirable to analyze forward emissions. The MPM includes a dichroic mirror DM which reflects multiphoton signals received from sample 1240 which may be further filtered with spectral filter F. The filtered emission is then provided to additional optical components and detection electronics for processing signals at wavelengths of interest. A controller can be used to control functionality of the laser system 1220, the MPM (e.g., the scanning mirrors, delivery and focusing optics, etc.), filtering and detection circuits, etc. Additional details of MPMs may be found at least in: U.S. Patent Application Pub. No. 2014/0023993 ('993), 'Apparatus and methods for multiphoton microscopy', Zeng et al; al.; http://w3.biosci.utexas.edu/pmc/webdocs/Multiphoton.pdf; 'Multiphoton Microscopy', by Leica Microsystems; and Leica TCS MP5 'Optimized for Muiltiphoton Imaging' Brochure, by Leica Microsystems.

In multiphoton microscopy it is desired to focus high quality ultrashort pulses onto the sample. At ultrashort wavelengths, particularly for pulses in the range from about 100 fs to about 1 picosecond (ps), dispersion contributions from the optical components in MPM 1230 are to be considered in the laser system design. In state of the art MPMs the laser system has components to pre-chirp the optical pulses such that the net dispersion of laser system 1220 and MPM 1230 is compensated. Notably, for the purpose of the discussion below, the focusing and delivery system MPM system 1230 generally exhibits a net positive dispersion, with $\delta_2$ (MPM)>0.

Figure 1C:
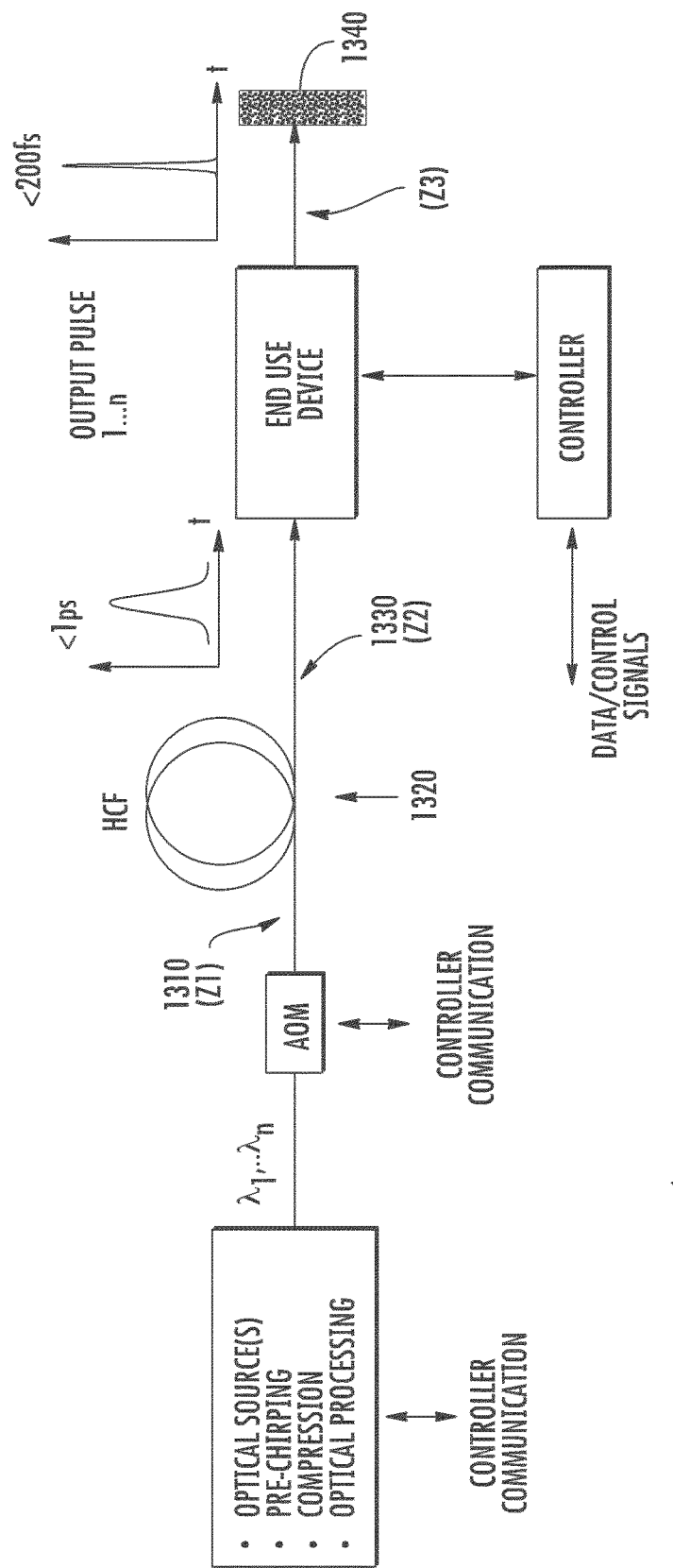
FIG. 1C schematically illustrates an arrangement in accordance with at least one embodiment of the present disclosure. The system generates ultrashort pulses at a plurality of pre-determined wavelengths suitable for use, for example, in multiphoton microscopy.

In accordance with an embodiment of the present disclosure a plurality of ultrashort pulses may simultaneously or sequentially be delivered to the sample. FIG. 1C schematically illustrates an arrangement in accordance with at least one embodiment of the present disclosure. The system generates ultrashort pulses at a plurality of pre-determined wavelengths $\lambda_1, \lambda_2, \ldots, \lambda_n$, n≥2, suitable for use, for example, with an MPM. Each of the plurality of wavelengths may be characterized by having a central wavelength and may include a pre-selected or pre-determined narrow range of wavelengths (e.g.: wavelength range <20 nm, <50 nm, <100 nm or suitable sub-ranges) near the central wavelength. A central wavelength may be in the near IR (e.g.: 0.7-1.4 μm), short-wavelength IR (e.g.: 1.4-3 μm), mid IR (3-8 μm), visible range (0.4-0.7 μm), or near UV (0.25-0.4 μm).

In the example of FIG. 1C one or more mode locked fiber oscillators act as an optical seed source to generate optical pulses. The optical pulses from the one or more mode locked fiber oscillators may be further processed to provide output in respective wavelength ranges. The optical source may include one or more optical amplifier(s) to generate amplified optical pulses. In some implementations mode locked source(s) and amplifiers may directly generate pulses at wavelength $\lambda_1, \lambda_2, \ldots, \lambda_n$. In some implementations optical pulses from the source may be directed to one or more of a Raman shifter, frequency upconverter, frequency downconverter, supercontinuum generator, and/or optical parametric amplifiers to generate selected output wavelengths or wavelength ranges.

In the laser system 1300, the resulting optical pulses are each pre-chirped, preferably with optical fibers or other integrated optic designs, so that high quality, compressed ultrashort pulses at the respective wavelengths are delivered to the sample 1340. Pre-chirping may be carried out with passive single mode step index fiber, specialty fiber including photonic crystal fiber (PCF) or photonic bandgap fiber (PBGF), or chirped fiber Bragg gratings, or non-chirped fiber Bragg gratings. In some implementations bulk optical components may be utilized alone or in combination with the fibers, for example prisms, grisms, bulk gratings or chirped mirrors. The dispersion of the laser system and End-Use-Device (e.g.: MPM) are to be well compensated at each of the wavelengths $\lambda_1, \lambda_2, \ldots, \lambda_n$. In various implementations a fiber coupler or other suitable beam combiner (not shown) receives the optical pulses having $\lambda_1, \lambda_2, \ldots, \lambda_n$ and directs the optical pulses along a common optical path.

In at least one preferred implementation an acousto-optic modulator (AOM) is configured to selectively transmit the optical pulses and to control the relative intensity of each of the optical pulses having $\lambda_1, \lambda_2, \ldots, \lambda_n$. The AOM may be in communication with the MPM end-use application via a controller. In at least one implementation output 1310 of the AOM may exhibit positive net dispersion, $\delta_2(Z1)_{net}+$, where Z1 is at the output 1310 of AOM as shown in FIG. 1C.

The output of the AOM is directed to a downstream delivery fiber 1320, which may be a hollow core fiber (HCF). The fiber may be a hollow core photonic crystal fiber (HC-PCF) or a hollow core photonic bandgap (HC-PBGF). Other hollow core fibers, for example, Kagome fibers can be used. In some implementations HC-PCF is configured to exhibit slight negative dispersion at various wavelengths. For example, the slight negative dispersion may have $|\delta_2|$ less than about $|-1 \text{ ps}^2|$. In typical MPM applications the end-user optical system is arranged with optical components that exhibit net positive dispersion. Thus, delivery fiber(s) 1320, among other components in the laser system, are configured at the selected wavelengths to provide for dispersion compensation. In at least one implementation output 1330 of the HCF 1320 may exhibit negative net dispersion, $\delta_2 (Z2)_{net}-$, where Z2 is at the output 1330 of the HCF 1320, as a result of the HCF configuration. Referring to FIG. 1C, in a preferred implementation a maximum pulse width at an input to the End Use Device may be about 1 ps. After the pre-compensated pulse is received by the End Use Device, followed by being focused and directed to the sample, the compressed pulse widths are less than about 200 fs, and may be in the range from about 100 fs to 200 fs. In various preferred implementations, to substantially compensate for the dispersion of the End Use Device, the overall dispersion of the system is selected to produce the shortest possible pulses at the desired point within the microscope system, with delivery of high quality pulses to the sample. This can for example be accomplished by appropriate adjustment of the length of optical delivery fiber 1320 or and/or other lengths of optical fiber within the laser system. Thus, the overall dispersion of the system (LS and End Use Device) can be selected to produce pulses with pulse widths in a range from about 100 fs to 200 fs, from about 30 fs to about 1 ps, or some other range, which may depend on the End Use Device.

An ultrashort optical pulse delivered to the sample, after passage through the End Use Device (e.g.: MPM optical system), may be substantially compensated such as to have nearly zero-dispersion or slightly positive dispersion as a result of compensation of $\delta_2 (Z3)_{net}+$, where Z3 is at the output of the End Use Device. By way of example, an MPM may exhibit net positive dispersion, $\delta_2$ (MPM)~4500 $\text{fs}^2$ at $\lambda$~1060 nm, although some variation between system designs is expected. The nearly zero dispersion or slightly positive dispersion at Z3 may, in various embodiments, have an absolute magnitude that is less than about 25%, less than about 20%, less than about 15%, less than about 10%, less than about 5% of the dispersion $\delta_2$ of the End Use Device. For example, embodiments of the laser system can substantially compensate the net dispersion of the MPM such that the absolute value of the dispersion of the optical pulses at Z3 is less than about 1200 $\text{fs}^2$, less than about 900 $\text{fs}^2$, less than about 700 $\text{fs}^2$, less than about 450 $\text{fs}^2$, or less than about 225 $\text{fs}^2$. In other embodiments, the magnitude of the dispersion can be less than about 1 $\text{ps}^2$. Accordingly, embodiments of the laser system can substantially compensate the net dispersion of the End Use Device (e.g., MPM) such that the absolute value of the dispersion of the output pulses at Z3 is in a range from 50 to 1000 $\text{fs}^2$, 100 to 2000 $\text{fs}^2$, 0 to 5000 $\text{fs}^2$, or some other suitable range depending on the design of the End Use Device.

The temporal pulse quality in turn may be characterized, at least in part, by the full width at half maximum (FWHM) and the pulse pedestal. As illustrated in the example of FIG. 1C short pulses transmitted to the End Use Device are converted to high quality, low pedestal ultrashort pulses 1, 2, . . . , n having corresponding wavelengths $\lambda_1, \lambda_2, \ldots, \lambda_n$ which simultaneously or sequentially irradiate sample 1340.

In various preferred embodiments the pedestals will be substantially less than 10%, and more preferably less than 1% of the peak value.

Figure 2:
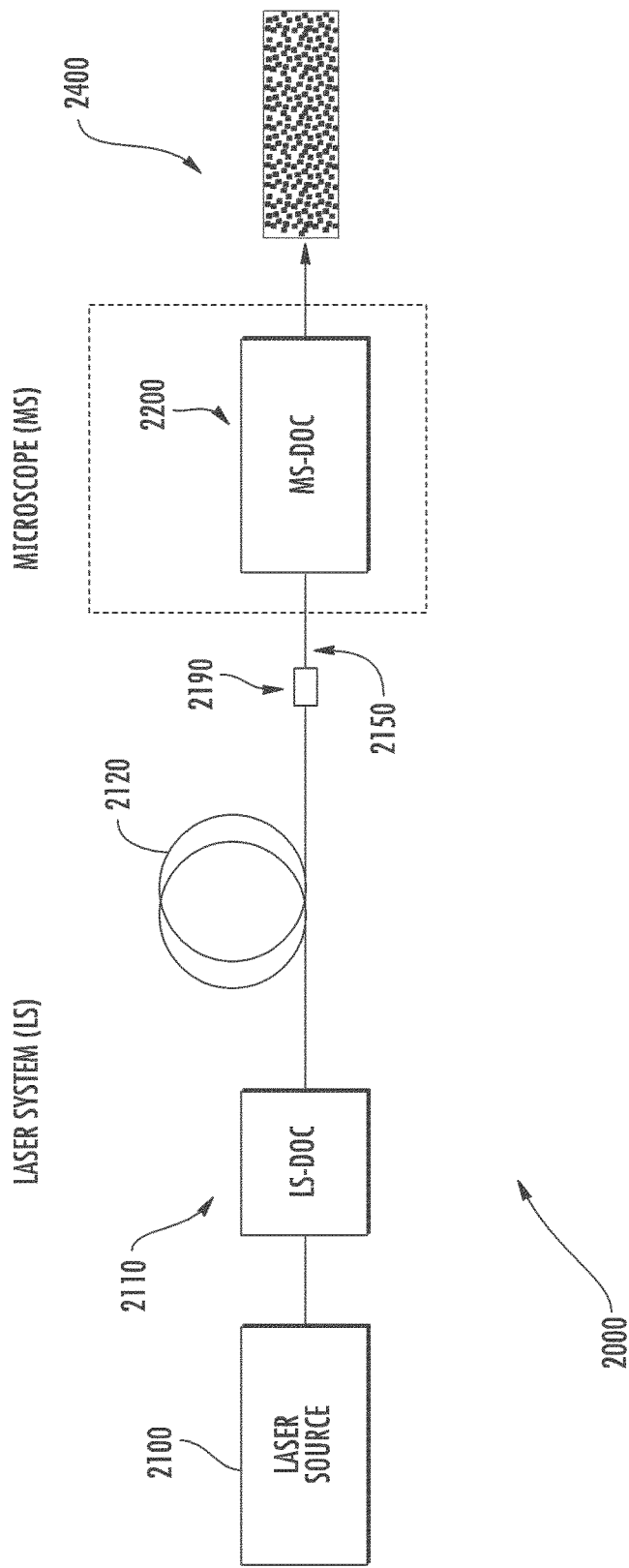
FIG. 2 schematically illustrates an example of a single wavelength arrangement which includes a laser system and microscope system for delivery of ultrashort pulses.

FIG. 2 schematically illustrates an arrangement 2000 which includes a laser system (LS) and microscope system (MS) for delivery of ultrashort pulses to a sample 2500. In this example the delivery fiber 2120 is supplied with the laser system and interfaced to the microscope for the end use application. For example the interface can include a precision fiber receptacle (FR) 2190 or docking point for the laser source having dispersive optical components, LS-DOC 2110, as shown in FIG. 2. In various implementations the FR may be located in the microscope system, at the distal end of the delivery fiber. For the purpose of illustration the center wavelength of the ultrashort pulses (e.g.: any single operating wavelength) is assumed to be a constant. As discussed above the microscope system includes dispersive optical components (MS-DOC 2200) having a net dispersion which is to be considered for interfacing to the laser system.

In a preferred implementation seed source 2100 includes a mode locked fiber oscillator to generate optical pulses, and may include one or more fiber amplifiers. Because the microscope MS is supplied with an optical system having materials which exhibit normal dispersion, for example fused silica, it is desired to provide dispersion compensation (pre-chirping) in the laser system to compensate the dispersion of the microscope MS as well as that of the overall laser system. For example, to substantially compensate for net dispersion in the MS, the LS may have a net dispersion with a sign that is opposite to the sign of the dispersion of the MS, and with a magnitude that is substantially equal to the magnitude of the dispersion in the MS. In various embodiments, the magnitude of the net dispersion of the LS may be equal to the magnitude of the dispersion of the MS to within ±20%, within ±15%, within ±10%, or within ±5%, depending on the embodiment.

In this example dispersive optical component(s) 2110 together with the delivery fiber(s) 2120 provide such compensation. At wavelengths below about 1.3 μm the dispersion of the optical components of the microscope will be in the normal dispersion regime. Depending on the choice of laser input wavelength and output characteristics the dispersive optical components for pre-chirping are selected. Such components may include bulk optical components, passive single mode step index fiber, photonic crystal fiber (PCF), photonic bandgap fiber (PBGF), prisms, grisms, bulk gratings, chirped mirrors, or chirped fiber Bragg grating, non-chirped fiber Bragg gratings. Notably, with PCF, PBGF, or chirped grating design(s) the dispersion may be engineered to provide negative dispersion at wavelengths wherein visible wavelength optics exhibit normal dispersion. Large core fibers, including multimode fibers configured for single mode operation, PBGFs, and PCFs, and hollow core variations provide an additional advantage of reduced susceptibility to non-linear effects. In a preferred implementation a design will be highly integrated, and may constitute an all-fiber arrangement. The delivery fiber may comprise a dispersion engineered hollow core PCF (HC-PCF) configured with negative dispersion used to at least partially compress the width of optical pulses and to yield a net negative dispersion at the output 2150 of the laser system which at least partially compensates positive dispersion of the microscope system 2200, and more preferably provides nearly zero net dispersion for pulses delivered to the sample. In a preferred implementation nearly-transform limited ultrashort pulses will be delivered to the sample 2400.

Figure 3:
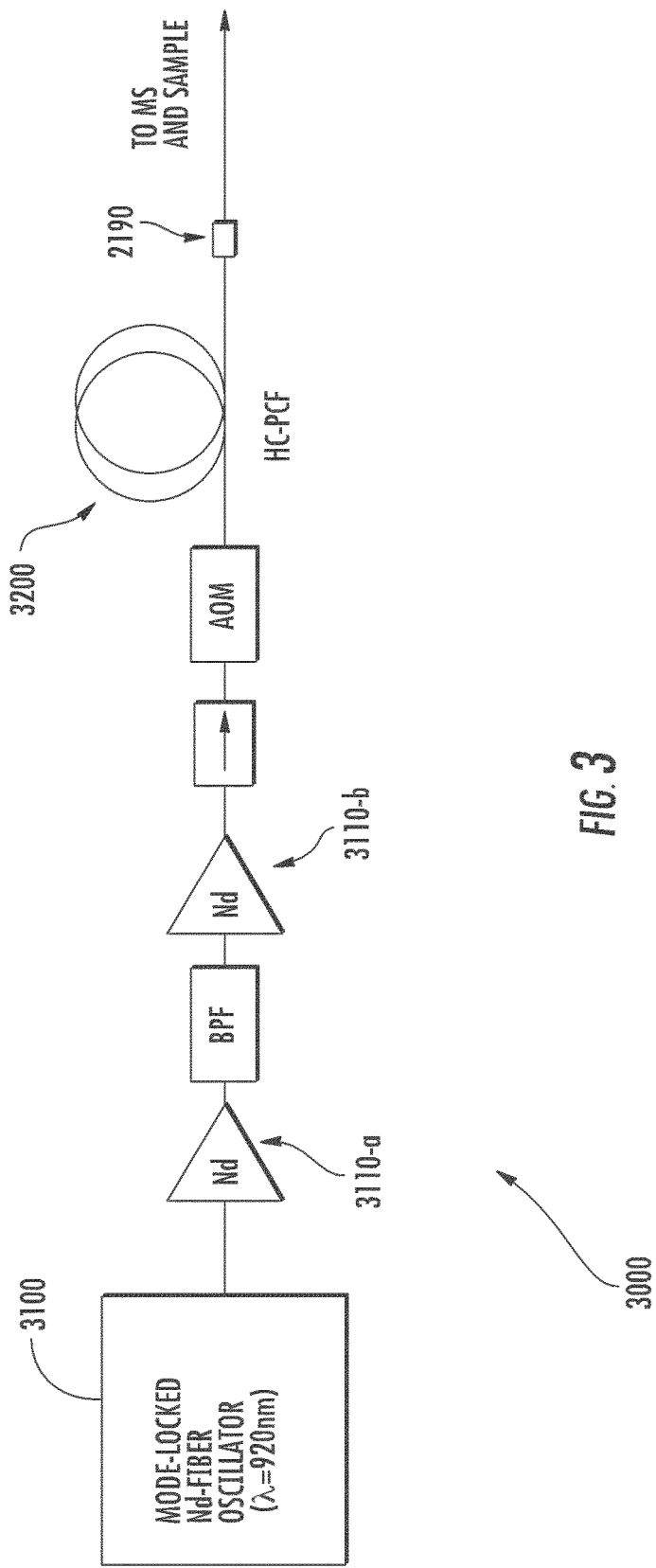
FIG. 3 schematically illustrates an example arrangement for generation and delivery of 920 nm ultrashort pulses.

FIG. 3 schematically illustrates an example arrangement 3000 for generation and delivery of 920 nm ultrashort pulses. In this example the seed source 3100 may include a mode locked Nd fiber oscillator configured to generates pulses at a center (e.g.: peak emission) wavelength of about 920 nm. One or more Nd amplifiers 3110-*a* and/or 3110-*b* may be used to increase peak power. A bandpass filter BPF may be used to attenuate undesirable spectral components and to limit ASE. The optical isolator suppresses unwanted back reflection.

By way of example, an Nd source may be provided with a center wavelength in the range from about 920 nm to 950 nm, with average output power up to about 1 W. The system may provide ultrashort pulses with pulse widths less than 200 fs, and in some implementations in the range from about 100 fs to about 150 fs. A pulse repetition rates may be in the range from about 10 MHz to about 100 MHz. In some implementations the output pulse energy may be up to several hundred nJ, or up to about 1 µJ, and consistent with the requirements for MPM. An optical delivery fiber 3200 may include a hollow core Kagome or photonic bandgap (HC-PBG) or photonic crystal fiber (HC-PCF) having a length of up to about 1 m, 4 m, or 10 m for interfacing to the End Use Device (e.g., MPM or MS). The output beam quality may be characterized by $M^2$ or other suitable measurements. An output beam having $M^2$ less than about 1.2, 1.4, or 1.5 may be provided by the delivery fiber. In some implementations the HC-PCF may be configured with single mode end caps so as to further improve output beam quality of pulses delivered to the sample.

Figure 3A:
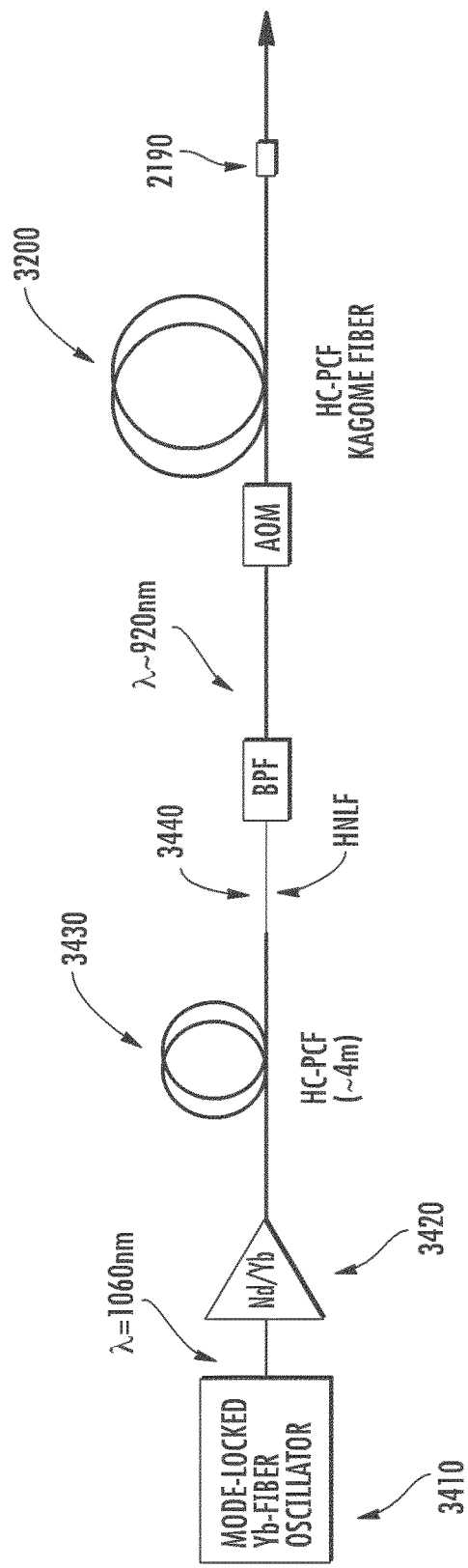
FIG. 3A schematically illustrates an example arrangement for generation and delivery of 920 nm ultrashort pulses with an Yb based system and continuum generation.

In at least one embodiment the seed input source 3100 contains a commercially available Yb oscillator (and optional amplifier) generating output in the 1 µm range (e.g.: 1030 nm, 1050 nm etc.). FIG. 3A separately illustrates an example of such an arrangement. The Yb oscillator 3410 and amplifier 3420 are used in conjunction with a continuum generator 3440 to generate a broadened spectral output which includes 920 nm. The continuum generator may include a length of highly non-linear fiber (HNLF) as shown to generate the broadened spectrum. By way of example, the HNLF may be a Model SC-5.0-1040, available from NKT Photonics A/S ('NKT'), which provides single mode propagation in a 4.8 µm core, bending insensitivity, while being dispersion optimized for 1 µm wavelength pumping. The resulting output spectrum may be filtered with a bandpass filter BPF to select a suitable range at about 920 nm for MPM or other applications. By way of example, a 40 mm length of fiber generated supercontinuum having a spectral extent of about 400 nm (measured approximately at the 10% point). A short pass filter with a cutoff wavelength of 1 µm resulted in a spectral content in the range from about 850 nm to 1000 nm. A hollow core (HC) fiber 3430, which may be a PBGF (HC-PBGF) or hollow core PCF (HC-PCF), may be disposed between the HNLF and Yb amplifier 3420. The fiber is configured with negative (anomalous) dispersion, $\delta_2<0$, and imparts a negative pre-chirp so as to at least partially compensate for positive (normal) dispersion accumulated in the path of the Yb amplifier and downstream optical components. Notwithstanding broadening and compression with dispersive optical components, sub-picosecond pulses can be maintained in the Yb based system, for example, pulses in the range from about 200 fs to about 1 ps. As in the example corresponding to FIG. 2 the downstream dispersion compensating delivery fiber 3200 receives output from AOM 3150. Fiber 3200 may include a hollow core PCF with negative dispersion or a Kagome fiber.

Figure 4:
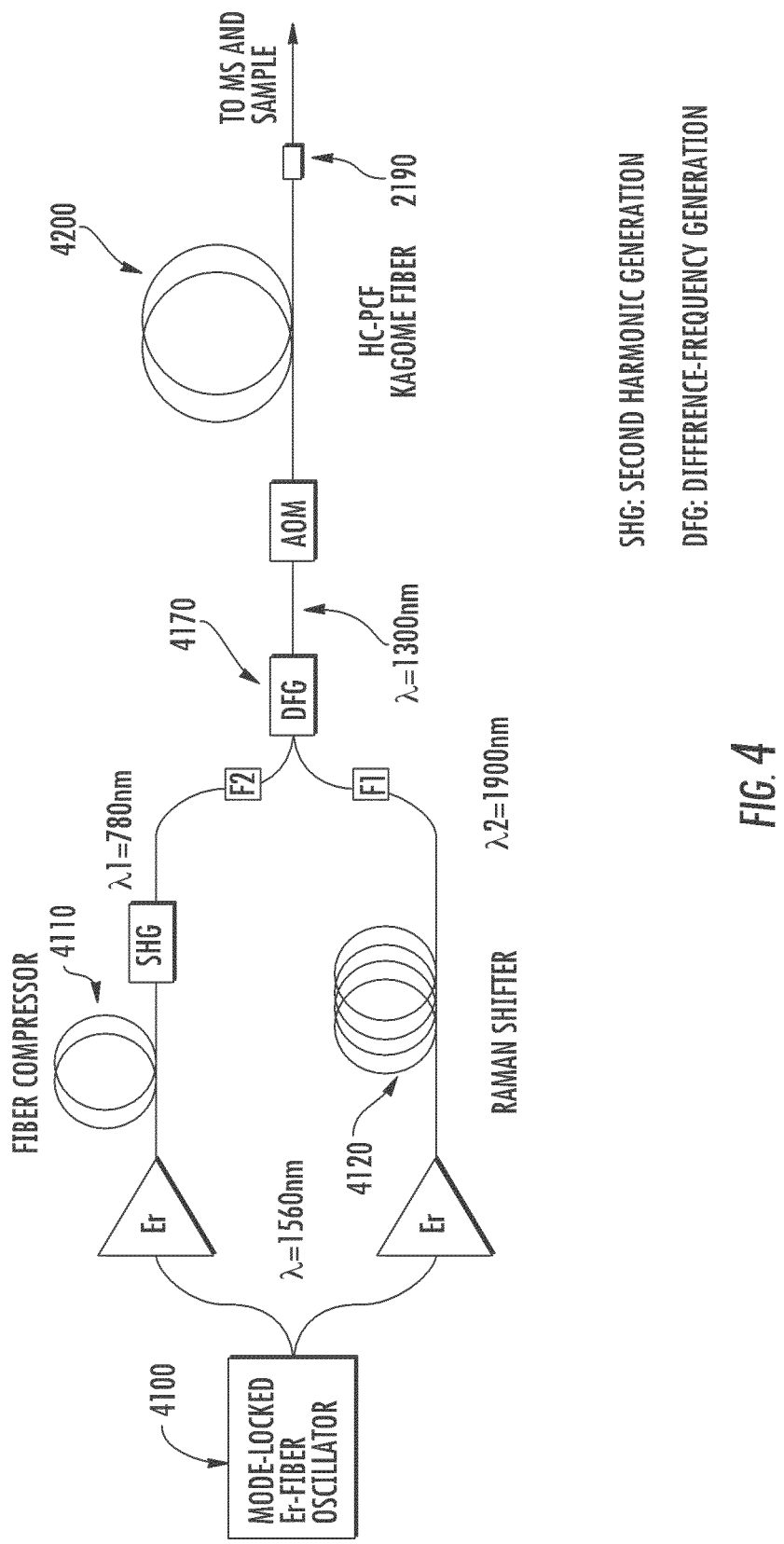
FIG. 4 schematically illustrates a first example arrangement for generation and delivery of 1300 nm ultrashort pulses.

Presently a commercial solution for the generation of high power femtosecond pulses in the 920 and 1300 nm wavelength, combined with fiber delivery, has not been demonstrated. Generation of high peak power pulses at 1300 nm with optical fibers presently presents some challenges because of the absence of appropriate fiber lasing materials. FIG. 4 schematically illustrates a first example arrangement for generation and delivery of 1300 nm ultrashort pulses. In this example a seed source includes a mode locked Er fiber oscillator/amplifier 4100 generating optical pulses at about 1560 nm, which may be amplified with Er or Er/Yb amplifiers at the output of the oscillator and/or in separate optical paths. The Er or Er/Yb amplifiers are preferably based on large mode area designs with core diameters between 10-50 µm to enable the amplification to high peak powers. Additional components for pulse stretching and compression may also be implemented. These components can for example comprise chirped fiber gratings, volume Bragg gratings, bulk gratings, grisms, prisms, chirped mirrors as well as fiber stretchers and compressors. Separate optical signal processing operations, which may include amplification with respective Er fiber amplifier(s), are carried out in separate optical paths (arms) which result in an approximate 1300 nm wavelength via difference frequency generation (DFG) in nonlinear crystal 4170, as will be further described below. Notably, at 1300 nm near-zero dispersion may be exhibited. In this example a hollow core fiber 4200 is configured with slight negative dispersion. For example, $\delta_2<0$, with $|\delta_2|$ less than about $|-1\ ps^2|$. In at least one embodiment a commercially available Kagome fiber may be utilized as provided by, for example, GLO Photonics SAS ('GLO') or NKT Photonics A/S ('NKT', Birkerød, Denmark).

Referring again to the example of FIG. 4 a non-linear crystal or non-linear waveguide 4170 which may include, for example, Periodically Poled Lithium Niobate (PPLN) or Periodically Poled Stoichiometric Lithium Tantalite (PPSLT), receives inputs at 780 nm and 1900 nm and via DFG, generates an approximate 1320 nm output. Separate optical signal processing functions in each arm include methods for wavelength shifting to support DFG. In the upper arm amplified optical pulses are compressed for example via nonlinear compression in fiber 4110 followed by frequency doubling 4140 via second harmonic generation as generally described in '877. A 780 nm output is obtained. The upper arm may contain integrated fiber components F2 for filtering and/or dispersion compensation.

In contrast, in the lower arm the Er fiber output is Raman shifted with optical fiber(s) 4120 which may include a silica optical fiber(s). The resulting shifted wavelength is about 1900 nm. The lower arm may also contain integrated fiber components F1 for filtering and/or dispersion compensation. Ultrashort pulse widths are preserved via Raman soliton generation in the length of fiber, for example as generally described in '330. The Raman-shifted pulses may further be amplified in Tm fiber amplifier (not shown).

The individual 780 nm and 1900 nm pulses, which are adjusted to maximize temporal overlap via a delay line or laser pulse control (not shown), are received in non-linear crystal 4170 configured for DFG and to produce an approximate 1320 nm wavelength. The AOM, as in other examples, is disposed downstream and receives the pulses having the plurality of wavelengths, $\lambda_1 \ldots, \lambda_n$ and is configured as a pulse selector and/or intensity modulator as discussed above. Pulses are directed to HC-PCF 4200 which, in this example, is a Kagome fiber. The 1300 nm output pulses, which may exhibit slight negative dispersion as a result of propagation in fiber 4200, are directed to the MS and sample. In certain implementations, additional frequency conversion stages can be included to frequency double the 1900 nm wavelength pulses, hence three wavelengths, 780 nm, 950 nm and 1320 nm can be generated using just one oscillator. Appropriate nonlinear crystals and dichroic mirrors or beam splitters can be implemented to combine all three wavelengths into one beam for coupling into a deliver fiber.

Figure 5:
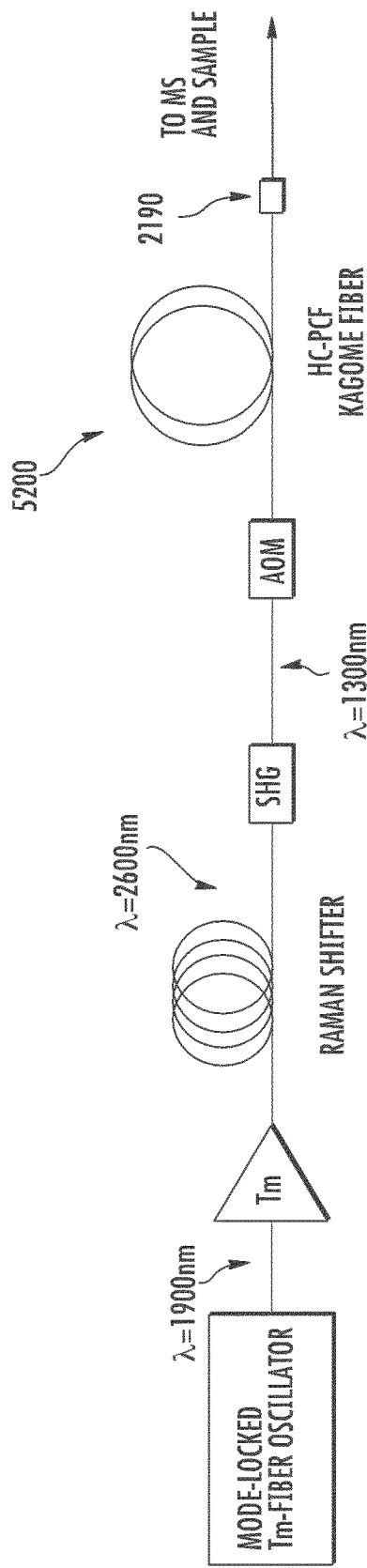
FIG. 5 schematically illustrates a second example arrangement for generation and delivery of 1300 nm ultrashort pulses.

FIG. 5 schematically illustrates a second example arrangement for generation and delivery of 1300 nm ultrashort pulses. In this example additional Raman shifting is utilized resulting in an in-line configuration. In this example the seed input source includes a Tm fiber oscillator and Tm fiber amplifier. A Raman shifter which includes one or more of a silica fiber, a fluoride fiber, or germanium doped fiber shifts a portion of the amplified pulses to a wavelength of about 2600 nm. Such a Raman shifter may be configured with several meters of optical fiber, and may have a total length of about 0.1-10 m. Ultrashort pulse widths are achieved via Raman soliton propagation. The peak power of the pulses is sufficiently high to support efficient frequency doubling with SHG. The 1300 nm output of SHG is directed to the AOM which acts as a pulse selector and/or intensity modulator. As in the example of FIG. 4, the HC-PCF Kagome fiber is used with slightly anomalous dispersion to produce compressed output pulses and to deliver the pulses to the microscope and sample. In a preferred implementation the pulses irradiating the sample will be nearly transform limited.

Figure 6:
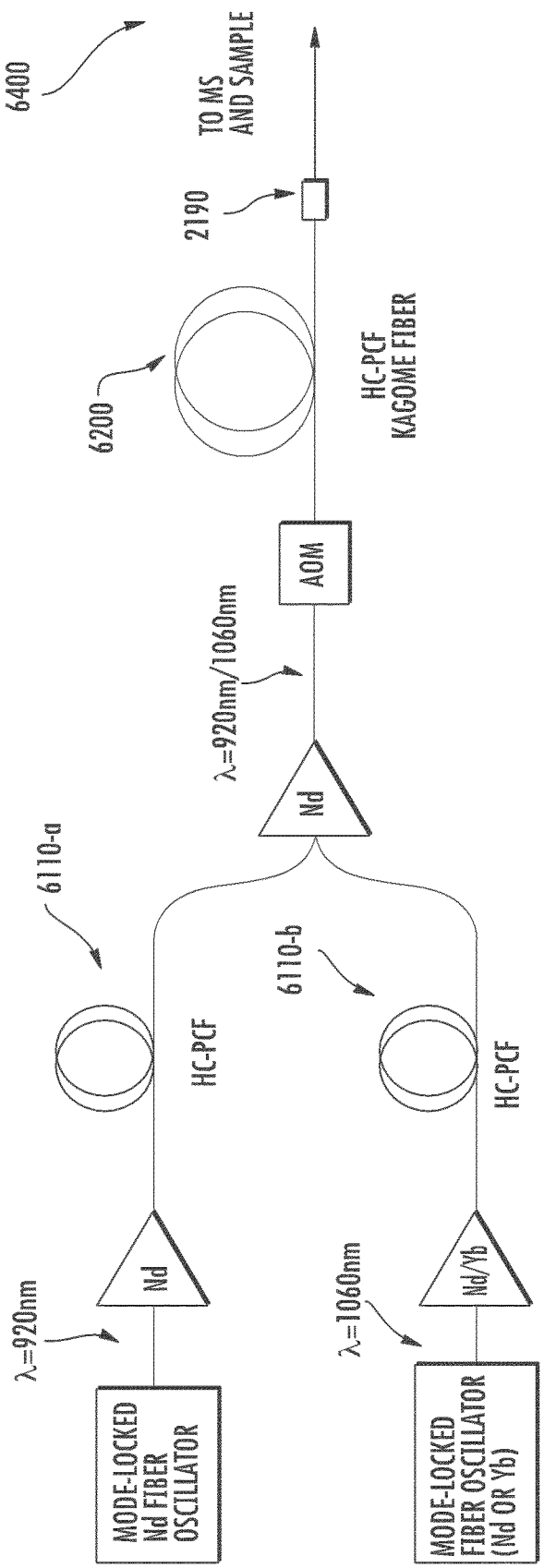
FIG. 6 schematically illustrates an example arrangement for generation and delivery of 920 nm and 1060 nm ultrashort laser pulses.

FIG. 6 schematically illustrates an example arrangement for generation of 920 nm and 1060 nm laser pulses and delivery with a single hollow core fiber. It is known in the field of multiphoton microscopy that 1060 nm pulse(s) with sufficient intensity can excite certain fluorophores. In a preferred implementation 920 nm pulses are generated with a source including mode locked Nd or Yb oscillators, Nd or Yb pre-amplifiers and a single Nd-fiber power amplifiers, as shown in FIG. 6. The wavelength of 920 nm can for example be generated with a Nd mode locked oscillator, whereas the wavelength of 1060 nm can be generated with either a Nd or Yb fiber mode locked oscillators. Appropriate Nd or Yb pre-amplifiers are then implemented for the two oscillators and the outputs from the pre-amplifiers (after appropriate dispersion compensation in HC-PCF fibers) are subsequently combined via a wavelength division multiplexing coupler (not shown). A final Nd fiber amplifier then is configured to amplify both wavelengths simultaneously. To balance the gain at 920 nm and 1060 nm, the use of large core Nd fiber amplifiers with core diameters in the range from 10-50 µm is preferred. Also the appropriate output at 920 nm and 1060 nm can for example by additional attenuators (not shown) upstream of the power amplifier or by adjusting the gain and output power of the pre-amplifiers. Though only one pre-amplifier is shown for each wavelength, more than one pre-amplifier may also be used. The Nd and Yb oscillators/amplifiers generally exhibit normal dispersion, $\delta_2 > 0$, at the wavelengths of interest in this example.

As illustrated in FIG. 6 each of the amplified outputs are directed to respective hollow core fibers 6110-*a*, 6110-*b*, which may be HC-PCFs, to obtain pre-chirped, compressed optical pulses with anomalous dispersion. The HC fiber outputs are then spatially combined and further amplified with the Nd power amplifier. The amplified output having wavelengths 920 nm and 1060 nm are directed to the AOM which acts as a pulse selector and/or intensity modulator. As in the examples illustrated in FIGS. 4 and 5 a HC-PCF 6200 includes a Kagome fiber configured with slightly negative dispersion to produce compressed output pulses and to deliver the pulses to the microscope and sample. Because the Kagome fiber exhibits somewhat different dispersion at the 920 nm and 1060 nm output wavelengths dispersion is adjusted in one or both of the HC-PCFs for compensation. In a preferred implementation the pulses irradiating the sample will be nearly transform limited. To obtain approximately transform limited pulses, the delivery fiber may be a Kagome fiber configured to produce dispersion values, $D(\lambda)$, in example ranges from about −10 to +10 ps/nm·km, −3 ps/nm·km to +3 ps/nm·km, or from about −1 to 1 ps/nm·km, over a relatively broad wavelength range (e.g.: $\Delta\lambda \sim 100$ nm, 200 nm, 400 nm, 800 nm), with $\delta_2 \sim 0$ over the wavelength range.

By way of example, a dual wavelength source for MPM may provide about 1 W average output power at 1060 nm and 0.5 W average power at 920 nm. Pulse widths may be less than about 200 fs at each wavelength, with a pulse repetitions rate in the range from about 10 MHz to about 100 MHz. A single HC delivery fiber may be utilized to transmit both wavelengths, and is dispersion engineered to compensate for overall system dispersion at each wavelength. Minimum pulse durations may be provided at the output of the delivery fiber. Peak output power may be in the range from about 10 kW to 100 kW. In at least one preferred implementation an AOM selectively directs 920 nm and 1060 nm pulses to the HC-PCF and may be operatively connected to a laser controller, MPM controller, or system controller. The wavelength selection for individual wavelengths can for example be performed by changing the modulation frequency to the AOM. This can result in a Bragg diffraction angle which is the same for both wavelengths. Such AOMs are for example available from AA Opto-Electronics, particularly part no. MT110+MDS1C.

Figure 7:
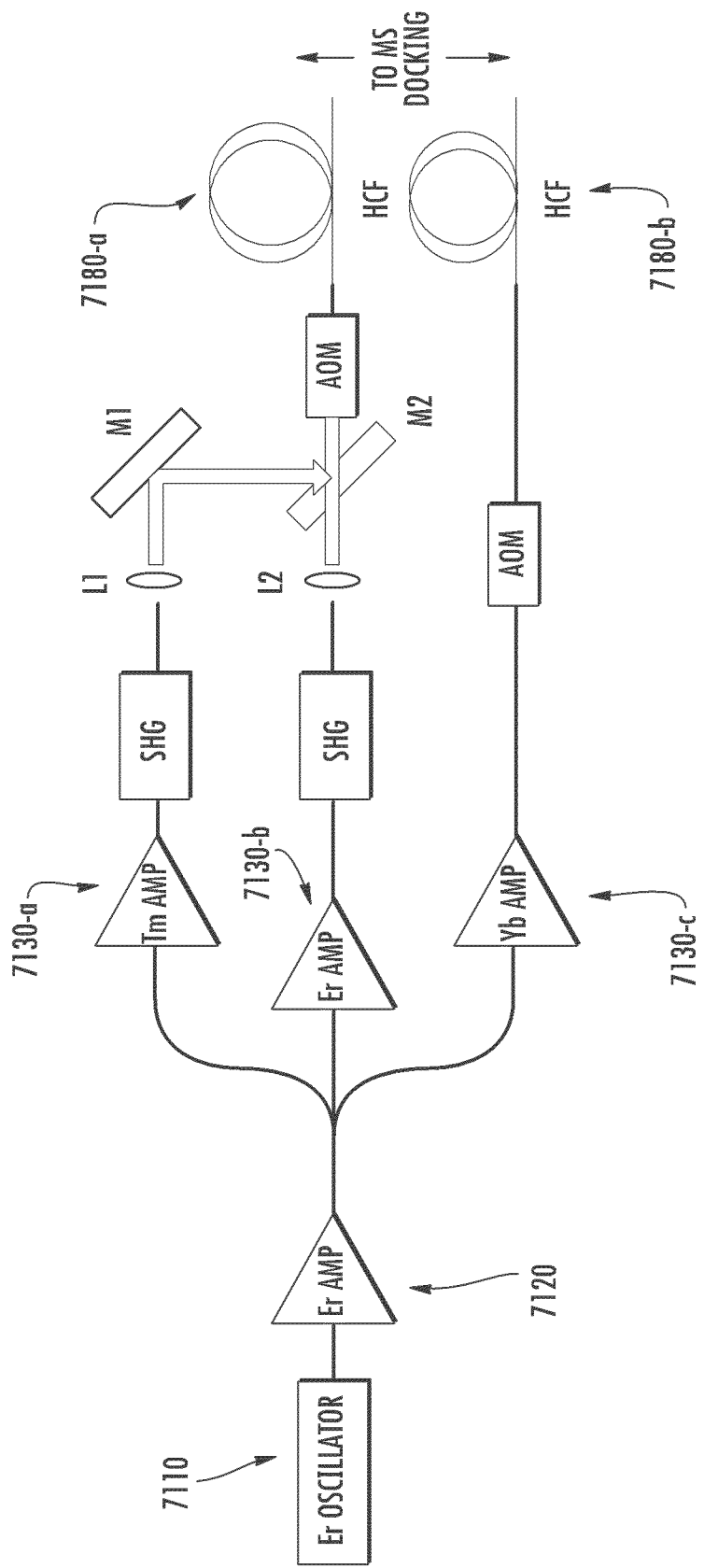
FIG. 7 schematically illustrates an example arrangement for generation and delivery of ultrashort pulses at multiple wavelengths, including 780 nm, 940 nm, and 1050 nm ultrashort laser pulses.

FIG. 7 schematically illustrates an example of a three wavelength system. In this example output from a single mode locked Er oscillator 7110 is amplified in a pre-amplifier 7120. It is then split into three optical paths and used to seed three different fiber amplifiers, e.g., Yb amplifier 7130-*c*, Er amplifier 7130-*b*, and Tm amplifier 7130-*a*. Additional supercontinuum fiber stages (not shown) can be inserted up-stream of the Tm and Yb amplifiers to produce appropriate seed wavelengths; those seed wavelengths can further be selected with appropriate optical filters (not shown). Although in FIG. 7, only one Yb, Er and Tm power amplifier stage is shown, more than one amplifier stage can be used on each optical path, respectively. The Tm amplifier 7130-*a* can generate an output of in the range of 1840 to 2100 nm, which after frequency doubling in the SHG stage can produce an output in the range from 920 to 1050 nm. Frequency doubling of the Er amplifier 7130-*b* output produces a wavelength in the range of 780 to 800 nm and the Yb amplifier 7130-*c* produces an output near 1050 nm. The two frequency doubled outputs can for example be combined with mirror M1 and dichroic mirror M2 (and optical elements L1, L2 such as lenses), directed to an AOM and delivered to a microscope docking station via a hollow core fiber (HCF) 7180-*a*, for example HC-PCF. The output of the Yb fiber amplifier 7130-*a* can equally be directed via a second AOM and a second length of HCF 7180-*b* (e.g.: HC-PCF) to a second docking station in the microscope system. The length(s) of the HC-PCFs is adjusted to ensure a near bandwidth-limited output at the desired target. In principle, only one MS docking station as well three different docking stations can be used, depending on the requirement of the microscope. Also, additional stages such as Nd-amplifiers or Ho-amplifiers and difference frequency generation can be implemented to generated output also at 1300 nm or 920 nm as described above. Essentially, any combination of Er, Nd, Yb, Ho and/or Tm amplifiers can be used to generate a desired multi-wavelength source with appropriate dispersion control to generate near bandwidth-limited pulses on a sample.

Whereas in FIG. 7 an Er seed oscillator is shown, other seed oscillators can also be used. It is to be understood that in certain implementations, components, for example seed input sources and amplifiers, may be shaped and frequency converted to reduce component cost, consistent with requirements for subsequent amplifiers. In MPM applications the 780/940 nm/1050 nm source can induce second harmonic generation (SHG) and is suitable for excitation of blue (B) and green (G) fluorophores, respectively. Additionally, the output may be suitable for applications in third harmonic generation (THG) and 3-photon microscopy such as coherent anti-Stokes Raman spectroscopy (CARS), as well as other applications in laser surgery and tissue modification.

Figure 7A:
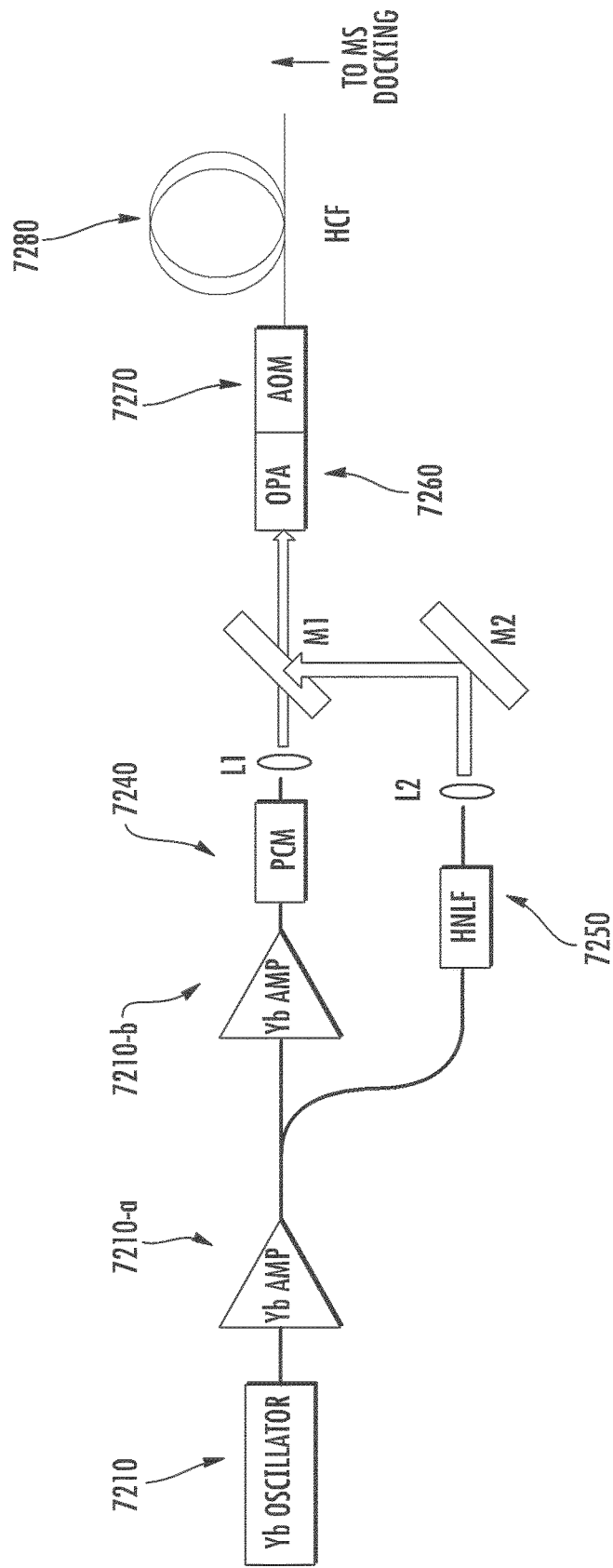
FIG. 7A schematically illustrates an example arrangement for the generation of mid IR light via optical parametric amplification.

Thus, the system described with respect to FIG. 7 can be designed to deliver many wavelengths simultaneously, but when more than three wavelengths, or broadly tunable output wavelengths (or difficult to access wavelengths) are required, optical parametric amplification can also be advantageously implemented. An example OPA configuration was previously described in FIG. 4 and Cols. 7-11 of '929 to Imeshev et al., reproduced in part in FIG. 7B. This source can be adapted to multi-photon microscopy as explained with respect to FIG. 7A of the present application. Here output generated with a mode locked Yb oscillator 7210 is amplified in an Yb pre-amplifier 7210-*a* and a section of the amplified output is diverted to a highly nonlinear fiber (HNLF) 7250, which can produce an output in the range from 1050-1700 nm via Raman shifting or supercontinuum generation. A dispersion compensating element (not shown) can also be included upstream of the HNLF. The Yb pre-amplifier is then further amplified in an Yb power amplifier, and compressed back to near the transform limit with a pulse compressor, for example in a pulse compressor module (PCM) 7240. The PCM 7240 can include a grating or prism pair, a volume Bragg grating as well as a hollow core fiber HCF. The output from the compressor and the HNLF 7250 are then combined with mirror M2 and dichroic beamsplitter M1 and directed to the OPA stage 7260. With a pulse energy of around 100 nJ, efficient amplification of any signal in the range from 1200-1700 nm can be obtained using for example nonlinear crystals such as PPLN or PPSLT. An AOM 7270 with an adjustable modulation frequency is inserted downstream of the OPA stage 7260 and the AOM output coupled in a hollow core fiber 7280 for beam delivery and docking to the microscope.

Figure 7B:
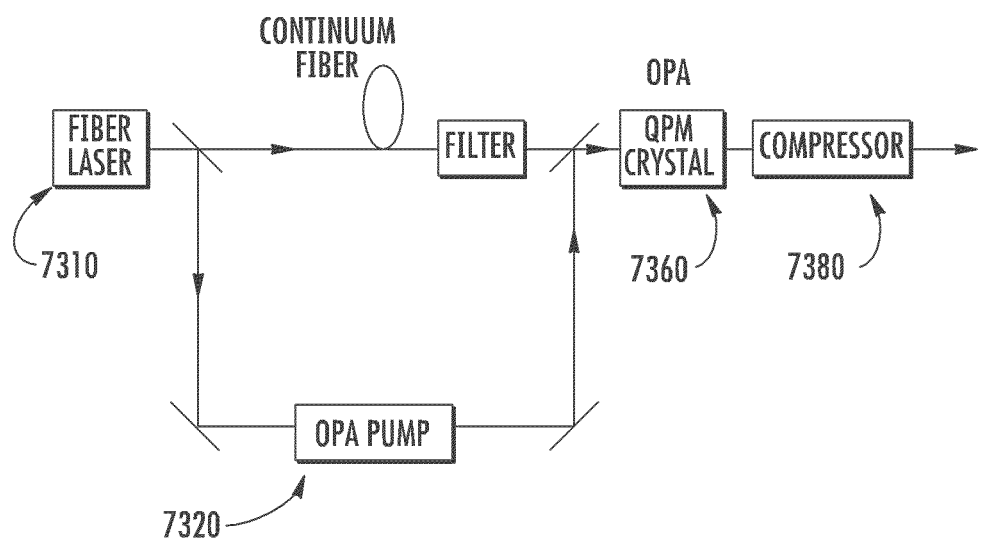
FIG. 7B schematically illustrates an alternative example arrangement for the generation of mid IR light via optical parametric amplification.

Referring to the example of an OPA in FIG. 7B, the output of a short-pulse fiber laser 7130 output is split into two arms by a beam splitter. In one arm is an OPA pump 7320 that provides pump power. The OPA pump 7320 outputs high-energy, narrow-bandwidth, pump pulses. In the second arm a continuum source generates broadband optical pulses which are filtered to select a pre-determined range of wavelengths. A nonlinear crystal 7360 receives the optical pump pulses and the broadband optical pulses from the continuum source. In this example the OPA system is configured such that the optical pump pulses and the broadband pulses from said continuum source propagate along separate optical paths at a time prior to being received by said nonlinear crystal. The broadband optical pulses derived from the continuum source are amplified by optical parametric amplification in the nonlinear crystal 7360. The amplified pulses are then compressed with the pulse compressor 7380, which may be a HCF, and in some preferred implementations will comprise a Kagome fiber. One advantage of the OPA arrangement is precise synchronization of the pump and signal. Although the output of the OPA is relatively broadband dispersion engineered HCFs can provide for high quality compressed pulses at the output of the End Use Device, which may be an MPM, EMPM, or laser surgery device.

Instead of an Yb oscillator front end, an Er oscillator front end can also be used. The Er oscillator can be used to generate a seed signal near 1050 nm via spectral broadening in a highly nonlinear fiber as shown with respect to FIG. 7, and the Er source can further be used to generate a seed signal at 1300 nm and 1700 via spectral broadening in a highly nonlinear fiber. The use of an Er seed source reduces the amount of spectral shift required for generating a signal near 1700 nm and can thus reduce the amount of amplitude noise in an optical parametric amplifier pumped via an amplified Yb fiber amplifier. Such a configuration is not separately shown.

Any of the systems discussed above is further compatible with endoscopic multi-photon microscopy, as for example discussed with respect with the '802 PCT Application. For example appropriate resonant excitation of the ends of the hollow core fiber can be implemented in conjunction with miniaturized x-y scanners to scan across a target area. The fluorescence signal can then be captured with another fiber and directed to an image analysis system. Such systems were already discussed with respect to '802, which is incorporated by reference herein in its entirety, and are not further described here.

Further, the example systems shown and described with reference to FIGS. 1B to 7B are not mutually exclusive. These example systems are presented to illustrate various features and functionalities and are not intended to be limiting. Accordingly, components from the various example systems can be used in other illustrated embodiments, interchanged, modified, or left out, depending on the desired goals or advantages to be achieved by any particular embodiment.

Example 1

920 nm Source Characterization

A 920 nm source was fabricated and characterized. A Nd seed source (180 mw, λ in the range from 880 nm-1000 nm, 46 MHz) was utilized with a single, Nd amplifier (4 m length). A 4 m length of PBGF (7 μm/110 μm core/clad ratio, 7/110) obtained from GLO Photonics was disposed downstream from the amplifier. The system also included optical isolators, filters, and other auxiliary components. In this example the Nd amplifier exhibited a dispersion value $D(\lambda) \sim -77$ ps/nm/km, $\delta_2 > 0$ net positive dispersion. The PBGF fiber exhibited D ($\lambda$)~140 ps/nm/km, $\delta_2 < 0$, net negative dispersion. At the output of the system (and without End Use Device microscope components) a spectral width, $\Delta\lambda$, of about 17.5 nm was achieved with an estimated 127 fs pulse width (FWHM). The autocorrelation function (ACF) displayed 196 fs FWHM which is around a factor of 1.5 longer than the actual pulse width due to the well-known ACF convolution factor. The pulse width was estimated as 127 fs based on a sech² approximation. The system achieved $M^2 \sim 1.3$ without SM end caps. FIGS. 8A-8D illustrates some experimental results.

Figure 8B:
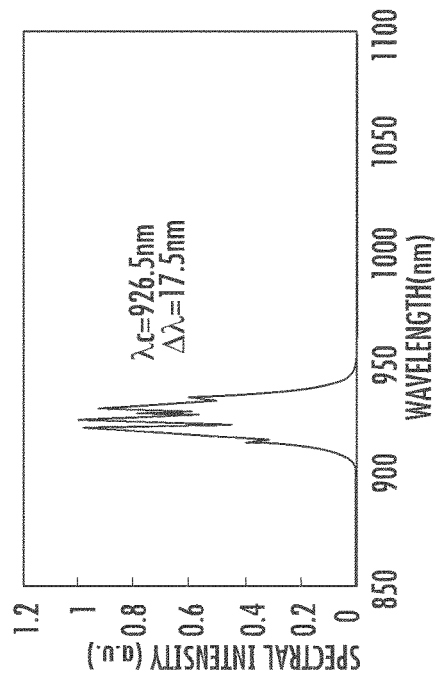
FIGS. 8A-8D illustrate various pulse characteristics obtained with a Nd laser source, including a delivery fiber.
Figure 8C:
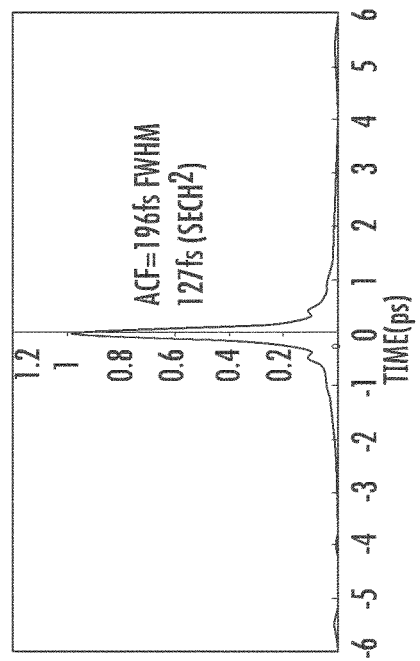
Figure 8A:
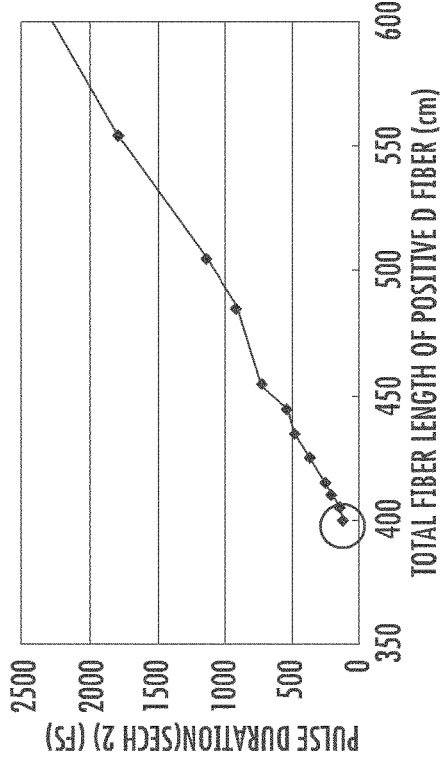

FIG. 8A shows the variation in pulse width as a function of the length of positive dispersion fiber, configured with $D(k)>0$. Based on cutback test results the 4 m length resulted in the 127 fs pulse width. It can be seen that as the fiber length was increased from 4 m to 6 m the pulse width increased from a few hundred fs to a few ps in a somewhat linear manner, illustrating the effect of dispersion.

FIG. 8B shows the measured spectrum, $\Delta\lambda \sim 17.5$ nm at $\lambda_c \sim 926.5$ nm.

FIG. 8C shows the pulse temporal shape obtained via an autocorrelation measurement. The ACF displayed 196 fs FWHM which includes the convolution factor of the ACF. The pulse width was estimated as 127 fs based on a sech² approximation.

Figure 8D:
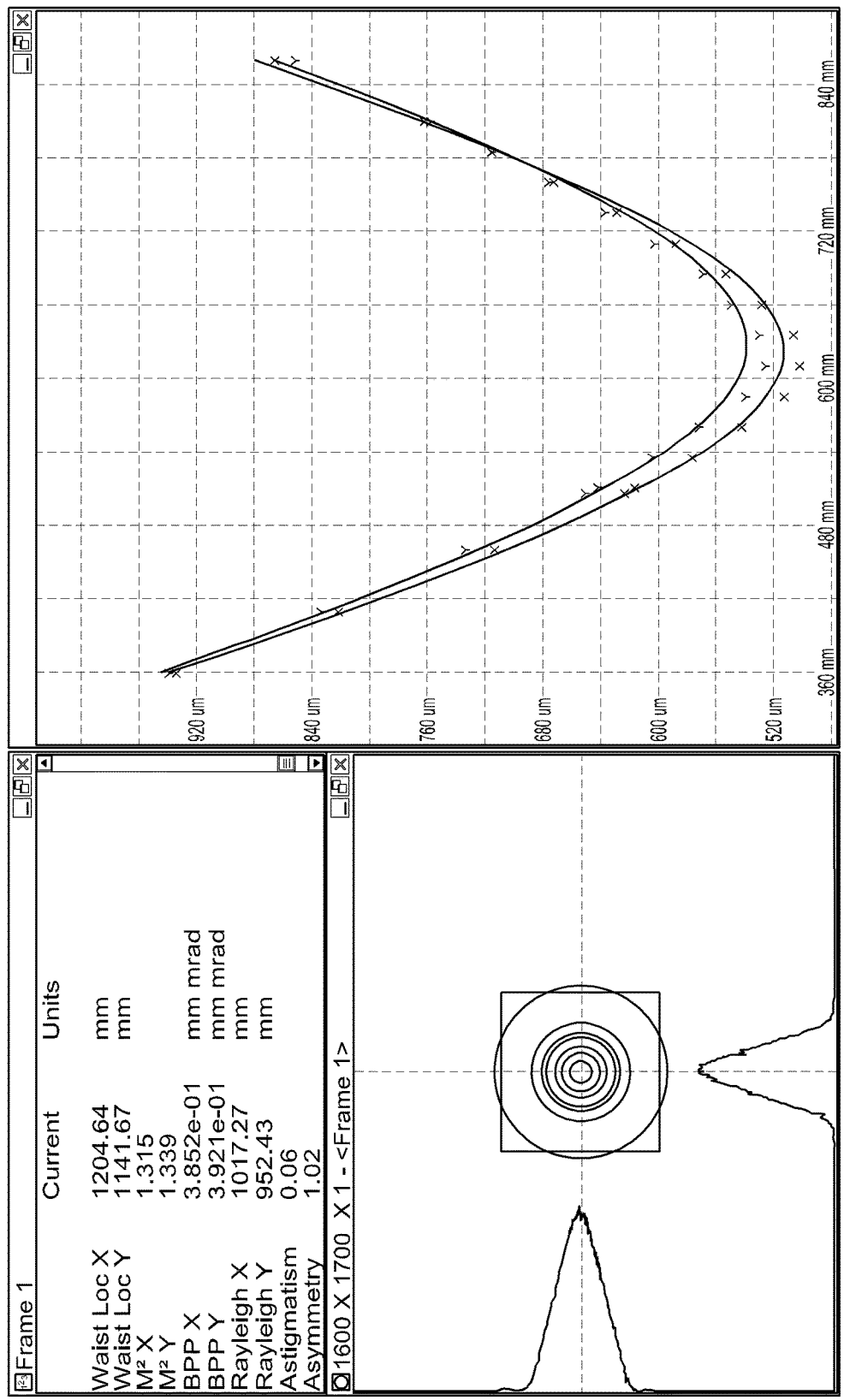

FIG. 8D illustrate the $M^2$ obtained at the outputs of the delivery fiber, $M^2_x \sim 1.32$, $M^2_y \sim 1.34$.

Example 2

Dispersion Engineered HC Fibers for 920 nm Operation

As discussed above, specialty fibers which include HC-PBGF, HC, PCF, and Kagome fibers may be dispersion engineered with normal or anomalous dispersion over a broad range of wavelengths. As discussed above, chirped fiber Bragg gratings and other options exists for producing anomalous dispersion at short wavelengths, but applications are limited. Single mode propagation can be provided with HC fibers, with negligible non-linear effects for many laser applications. Some examples of specialty fibers for operation at 920 nm follow.

Figure 9A:
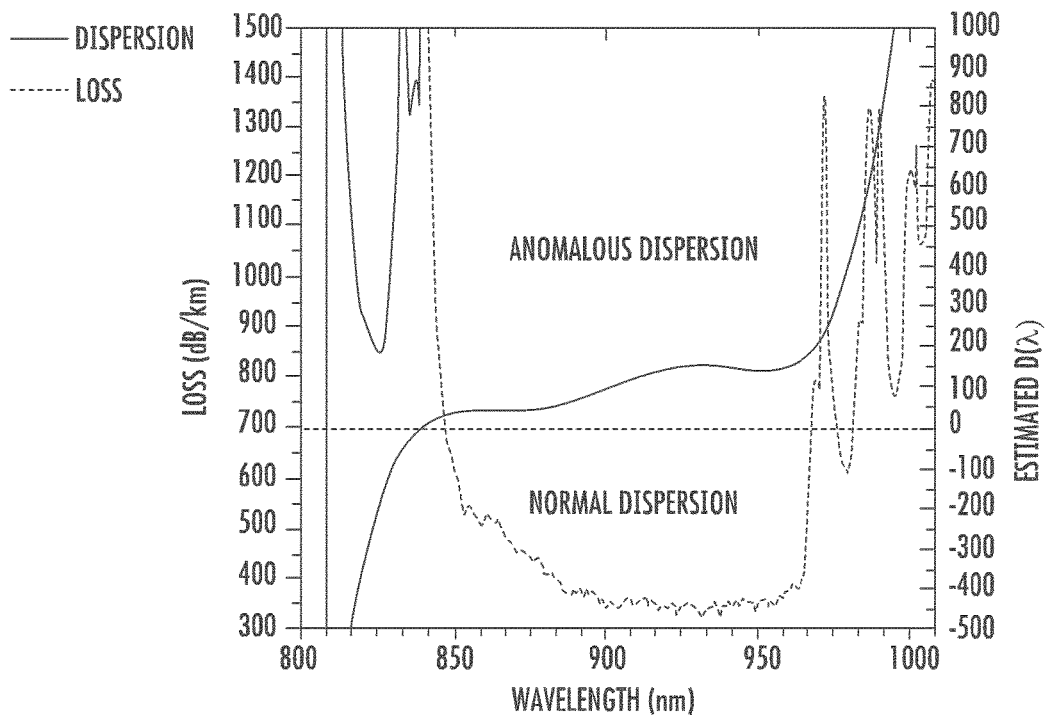
FIGS. 9A and 9B illustrate dispersion characteristics of certain specialty fibers at wavelengths of interest.

FIG. 9A is a plot illustrating dispersion characteristics of a HC fiber available from GLO Photonics SAS ('GLO'). The fiber loss is shown as the dashed curve and the fiber dispersion $D(\lambda)$ is shown as the solid curve. It can be seen that loss is minimal near 920 nm. The estimated dispersion is relatively flat about the wavelength of interest, with the fiber exhibiting slight anomalous dispersion with $D(\lambda) \sim 100$ ps/nm·km. This fiber is suitable for pre-chirping in accordance with embodiments of the present disclosure which generate 920 nm pulses.

Figure 9B:
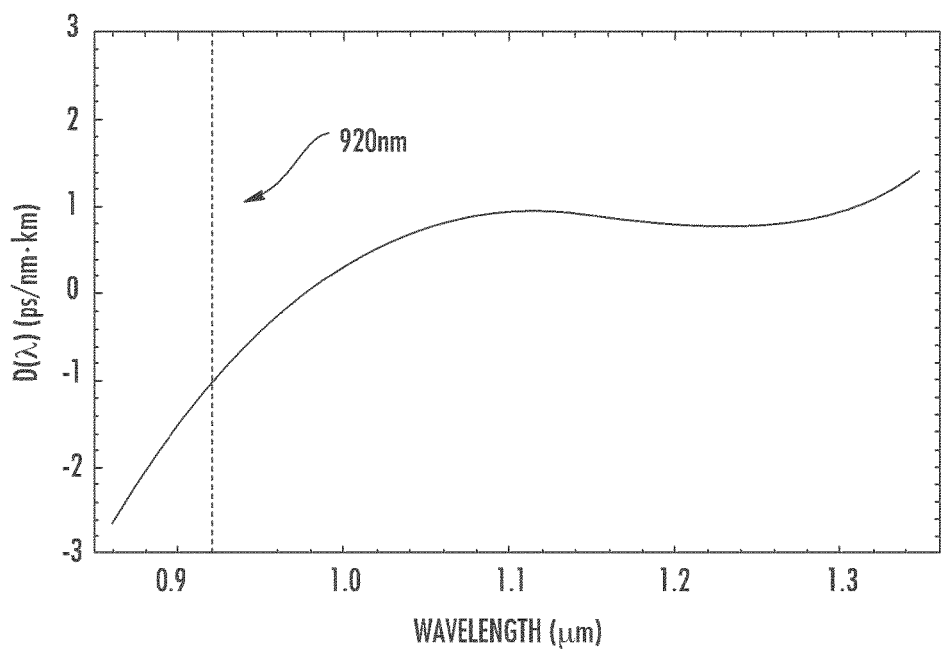

FIG. 9B is a plot illustrating the dispersion characteristics of a Kagome fiber available from and modeled by GLO Photonics SAS ('GLO'). In this example $D(\lambda) \sim 0$, on the average over a spectral range from about 900 nm to about 1300 nm. $D(\lambda)$ varies by about ±3 ps/nm·km over the wavelength range. The fiber features single mode propagation in a large mode, with core diameter greater than 50 μm. A Kagome fiber is configured to produce dispersion values, $D(\lambda)$, in the range from about −10 to +10 ps/nm·km, $\delta_2 \sim 0$. The fiber is suitable for use as a delivery fiber in accordance with embodiments of the present disclosure, and suitable for use over a relatively broad range of central wavelengths, $\lambda_c$, in the visible and/or near IR. Furthermore, the fiber may be configured for transmission over a wavelength range, $\Delta\lambda$ of at least about 500 nm, and may be characterized by having low or flattened dispersion.

Additional Examples and Embodiments

The present application discloses various embodiments described in the following aspects.

In a 1st aspect, a laser system is configured to provide ultrashort pulses at a plurality of output wavelengths, $\lambda_1 \ldots \lambda_n$, wherein $n \geq 2$. The laser system comprises at least one mode locked laser configured to generate ultrashort input pulses having one or more wavelengths; dispersive optical components disposed downstream from said at least one mode locked laser; and an optical delivery fiber configured such that at each of said wavelengths, $\lambda_1 \ldots \lambda_n$, net dispersion exhibited by said at least one mode locked laser, said dispersive optical components and said optical delivery fiber substantially compensates a net dispersion of an end use device disposed downstream from said laser system, said end use device configured to irradiate a sample with ultrashort pulses, wherein said end use device is configured to deliver femtosecond pulses having a selected plurality of said output wavelengths $\lambda_1 \ldots \lambda_n$, to said sample, each of said femtosecond pulses substantially compensated for the net dispersion of said laser system and said end use device.

In a 2nd aspect, the laser system according to aspect 1, wherein said at least one mode locked laser comprises at least one mode locked fiber oscillator.

In a 3rd aspect, the laser system according to aspect 2, wherein said at least one mode locked fiber oscillator comprises one or more of an Nd fiber oscillator, a Yb fiber oscillator, an Er fiber oscillator, a Tm fiber oscillator, or a Ho fiber oscillator.

In a 4th aspect, the laser system according to aspect 2 or aspect 3, wherein said at least one mode locked fiber oscillator generates input pulses having one or more wavelengths of said plurality of output wavelengths, $\lambda_1 \ldots \lambda_n$.

In a 5th aspect, the laser system according to any one of aspects 1-4, further comprising an optical modulator receiving pulses at said plurality of wavelengths, said modulator configured to controllably select one or more pulses at said plurality of wavelengths and/or to control the output power at said wavelengths.

In a 6th aspect, the laser system according to aspect 5, wherein said optical modulator comprises an acousto-optic modulator, an electro-optic modulator, or an integrated Mach Zehnder modulator.

In a 7th aspect, the laser system according to any one of aspects 1-6, further comprising a controller in communication with said end use device.

In an 8th aspect, the laser system according to any one of aspects 1-7, wherein said optical delivery fiber is configured with pre-selected dispersion at multiple wavelengths of said plurality of output wavelengths, $\lambda_1 \ldots \lambda_n$.

In a 9th aspect, the laser system according to any one of aspects 1-8, wherein n=2, and said wavelengths are approximately 920 nm and 1060 nm.

In a 10th aspect, the laser system according to any one of aspects 1-9, wherein n=3, and said wavelengths are approximately 920 nm, 1060 nm, and 1300 nm.

In an 11th aspect, the laser system according to any one of aspects 1-10, wherein n=3, and said wavelengths are approximately 780 nm, 940 nm and 1050 nm. In another aspect, the laser system according to any one of aspects 1-10, wherein n=3, and said wavelengths are approximately 780 nm, 950 nm and 1320 nm.

In a 12th aspect, the laser system according to any one of aspects 1-11, wherein said system comprises a Raman shifting fiber configured for Raman soliton propagation.

In a 13th aspect, the laser system according to aspect 12, wherein said Raman shifting fiber shifts an input wavelength to one or more of the plurality of output wavelengths $\lambda_1 \ldots \lambda_n$.

In a 14th aspect, the laser system according to aspect 12 or aspect 13, wherein said Raman shifting fiber produces an output wavelength of about 2600 nm, and said system comprises a frequency doubler to generate 1300 nm optical pulses.

In a 15th aspect, the laser system according to any one of aspects 1-14, wherein said system comprises a frequency converter configured for upconverting a frequency of optical pulses.

In a 16th aspect, the laser system according to any one of aspects 1-15, wherein said system comprises a crystal for DFG, and an output from said DFG comprises one of more of the wavelengths $\lambda_1 \ldots \lambda_n$.

In a 17th aspect, the laser system according to any one of aspects 1-16, wherein said optical delivery fiber comprises a HC-PCF, a HC-PBGF, or a Kagome fiber.

In an 18th aspect, the laser system according to any one of aspects 1-17, wherein said optical delivery fiber exhibits slightly anomalous dispersion at one or more output wavelengths, $\lambda_1 \ldots \lambda_n$.

In a 19th aspect, the laser system according to any one of aspects 1-18, wherein said ultrashort pulses irradiating said sample are nearly transform limited, and comprise pulse widths in the range from about 100 fs to about 1 ps with a pulse pedestal substantially below 10% of a peak value of the ultrashort pulses.

In a 20th aspect, the laser system according to any one of aspects 1-19, wherein said dispersive components disposed downstream from said at least one mode locked laser comprise specialty fiber arranged to pre-chirp an input signal and vary a pulse width of said input signal via normal or anomalous dispersion.

In a 21st aspect, the laser system according to any one of aspects 1-20, wherein $\lambda_1 \ldots \lambda_n$ comprises a wavelength at or near 920 nm.

In a 22nd aspect, the laser system according to any one of aspects 1-21, said wavelength comprising, as $\lambda_1$, the 900 to 950 nm wavelength range and, as $\lambda_2$, the 1030 to 1080 nm wavelength range, wherein said system configured with a single Nd power amplifier simultaneously amplifying optical pulses having respective wavelengths in each of the two wavelength ranges $\lambda_1$ and $\lambda_2$.

In a 23rd aspect, the laser system according to any one of aspects 1-22, further comprising: an optical parametric amplifier (OPA) disposed between said at least one mode locked laser and said optical delivery fiber, wherein said OPA generates a plurality of OPA output wavelengths, n>2, for use in said End-Use Device, and wherein said optical delivery fiber is configured with dispersion at each of said OPA wavelengths such that compressed optical pulses having pulse widths less than about 200 fs are provided from said end use device to irradiate said sample.

In a 24th aspect, an end use device utilizing ultrashort pulses to irradiate a sample, comprises the laser system according to any one of aspects 1-23; delivery and focusing optics having predetermined net dispersion at each of a plurality of wavelengths, $\lambda_1 \ldots \lambda_n$, wherein n≥2, wherein the net dispersion in each of said laser system and said end use device at each of said wavelengths $\lambda_1 \ldots \lambda_n$ is sufficiently compensated to result in nearly transform limited ultrashort pulses having pulse widths in the range from about 100 fs to about 1 ps.

In a 25th aspect, the end use device according to aspect 24, said device configured as a multiwavelength, multiphoton microscope (MPM).

In a 26th aspect, the end use device according to aspect 24 or aspect 25, said device configured as a multiwavelength, multiphoton endoscopic microscope (EMPM)

In a 27th aspect, the end use device according to any one of aspects 24-26, wherein $\lambda_1 \ldots \lambda_n$ comprises a wavelength at or near 920 nm.

In a 28th aspect, a laser system configured to generate ultrashort pulses to irradiate a sample, comprises a mode locked laser configured to generate input pulses; a highly nonlinear fiber configured to generate a frequency broadened spectrum downstream of said mode locked laser, said broadened spectrum overlapping at least partially with a signal wavelength range $\Delta\lambda$, dispersive optical components disposed downstream from said mode locked laser; an optical parametric amplifier (OPA) disposed downstream from said mode locked laser, said OPA configured to amplify optical pulses with a corresponding pulse spectrum within the wavelength range $\Delta\lambda$; and an optical delivery fiber configured such that within said wavelength range $\Delta\lambda$, the net dispersion exhibited by said mode locked laser, said dispersive optical components, said OPA, and said optical delivery fiber substantially compensates a net dispersion of an end use apparatus disposed downstream from said laser system, said end use apparatus configured to irradiate a sample with femtosecond pulses generated with said OPA.

In a 29th aspect, the laser system according to aspect 28, wherein said OPA is configured to generate tunable pulses within said signal wavelength range $\Delta\lambda$.

In a 30th aspect, the laser system according to aspect 28 or aspect 29, wherein said system comprises one or more optical amplifiers disposed downstream from said mode locked laser.

In a 31st aspect, the laser system according to any one of aspects 28-30, wherein said system comprises an optical pulse compressor disposed in a first optical path and providing compressed optical pulses; said highly non-linear fiber disposed in a second optical path, wherein said compressed optical pulses and said spectrally broadened optical pulses are delivered to said OPA; and an optical modulator disposed between said OPA and said optical delivery fiber, said optical modulator configured to select optical pulses, to selectively transmit pulses having said output wavelengths, and/or control the intensity of output pulses.

In a 32nd aspect, the laser system according to aspect 31, wherein said highly non-linear fiber generates an output in the range from 1050 to 1700 nm via Raman shifting or supercontinuum generation.

In a 33rd aspect, the laser system according to any one of aspects 28-32, wherein said OPA is configured to amplify pulses having wavelength(s) in the range from about 1200 nm to 1700 nm.

In a 34th aspect, the laser system according to any one of aspects 28-33, wherein said optical delivery fiber comprises a Kagome fiber characterized by having low or flattened dispersion over a portion of the output wavelength range, $\Delta\lambda$, of at least about 500 nm.

In a 35th aspect, an end use apparatus configured for MPM and interfaced to the laser system according to any one of aspects 28-34.

In a 36th aspect, an end use apparatus configured for laser surgery and interfaced to the laser system according to any one of aspects 28-35.

The following patents, patent applications, and non-patent publications are pertinent to the present disclosure:

U.S. Pat. No. 5,862,287 ('287) and U.S. Pat. No. 6,249,630, ('630), 'Apparatus and method for delivery of dispersion-compensated ultrashort optical pulses with high peak power, Stock et al.;

U.S. Pat. No. 5,880,877 ('877), "Apparatus and method for the generation of high-power femtosecond pulses from a fiber amplifier", Fermann et al.;

U.S. Pat. No. 6,236,779 ('779) and U.S. Pat. No. 6,389,198 ('198), "Photonic crystal fiber system for sub-picosecond pulses", Kafka et al.;

U.S. Pat. No. 6,885,683, ('683), 'Modular, high energy, widely-tunable ultrafast fiber source', Fermann et al.;

U.S. Pat. No. 7,257,302, ('302), 'In-line, high energy fiber chirped pulse amplification system', Fermann et al.;

U.S. Pat. No. 8,040,929, ('929), 'Optical parametric amplification, optical parametric generation, and optical pumping in optical fibers systems', Imeshev et al.

U.S. Patent Application Pub. No. 2012/0195330 ('330), 'Methods and systems for fiber delivery of high peak power optical pulses', Cho et al.;

U.S. Patent Application Pub. No. 2014/0023993 (993), 'Apparatus and methods for multiphoton microscopy', Zeng et al;

International PCT Application No. PCT/US2015/011802, ('802), "Methods and systems for high speed laser surgery", filed Jan. 16, 2015;

'Ultrafast lasers, Technology and Applications', Section 3.3: Linear pulse propagation in optical fibers, pgs. 92-99, edited by Fermann et al., Marcel Dekker, 2003 (hereinafter referred to as 'Ultrafast Lasers');

'Multiphoton Microscopy', available from http://w3.biosci.utexas.edu/pmc/webdocs/Multiphoton.pdf, by Leica Microsystems (Mannheim, Germany); and Leica TCS MP5 'Optimized for Multiphoton Imaging' Brochure, by Leica Microsystems (Mannheim, Germany).

For purposes of summarizing the present disclosure, certain aspects, advantages, embodiments, examples, and novel features of the disclosure are described herein. It is to be understood, however, that not necessarily all such advantages may be achieved in accordance with any particular embodiment. Thus, various aspects of the present disclosure may be embodied or carried out in a manner that achieves one or more advantages without necessarily achieving other advantages as may be taught or suggested herein. No feature or group of features is necessary or indispensable for each embodiment.

The example experiments, experimental data, tables, graphs, plots, photographs, figures, and processing and/or operating parameters (e.g., values and/or ranges) described herein are intended to be illustrative of operating conditions of the disclosed systems and methods and are not intended to limit the scope of the operating conditions for various embodiments of the methods and systems disclosed herein. Additionally, the experiments, experimental data, calculated data, tables, graphs, plots, photographs, figures, and other data disclosed herein demonstrate various regimes in which embodiments of the disclosed systems and methods may operate effectively to produce one or more desired results. Such operating regimes and desired results are not limited solely to specific values of operating parameters, conditions, or results shown, for example, in a table, graph, plot, figure, or photograph, but also include suitable ranges including or spanning these specific values. Accordingly, the values disclosed herein include the range of values between any of the values listed or shown in the tables, graphs, plots, figures, photographs, etc. Additionally, the values disclosed herein include the range of values above or below any of the values listed or shown in the tables, graphs, plots, figures, photographs, etc. as might be demonstrated by other values listed or shown in the tables, graphs, plots, figures, photographs, etc. Also, although the data disclosed herein may establish one or more effective operating ranges and/or one or more desired results for certain embodiments, it is to be understood that not every embodiment need be operable in each such operating range or need produce each such desired result. Further, other embodiments of the disclosed systems and methods may operate in other operating regimes and/or produce other results than shown and described with reference to the example experiments, experimental data, tables, graphs, plots, photographs, figures, and other data herein. Also, for various values disclosed herein, relative terms "about", "approximately", "substantially", and the like may be used. In general, unless indicated otherwise, relative terms mean within ±20%, within ±15%, within ±10%, within ±5%, depending on the embodiment.

Other systems, setups, and parameters may be used in other implementations, which may provide the same or different results. Many variations are possible and are contemplated within the scope of this disclosure. Materials, components, features, structures, and/or elements may be added, removed, combined, or rearranged. Additionally, process or method steps may be added, removed, or reordered. No single feature or step, or group of features or steps, is indispensable or required for each embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. As used herein, a phrase referring to "at least one of" a list of items refers to any combination of those items, including single members. As an example, "at least one of: a, b, or c" is intended to cover: a, b, c, a-b, a-c, b-c, and a-b-c. In addition, the articles "a" and "an" as used in this application and the appended claims are to be construed to mean "one or more" or "at least one" unless specified otherwise.

Thus, while only certain embodiments have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A laser system configured to provide ultrashort pulses at a plurality of output wavelengths, $\lambda_1 \ldots \lambda_n$, wherein n≥2, said laser system comprising:

at least one mode locked laser configured to generate ultrashort input pulses having one or more wavelengths;

dispersive optical components disposed downstream from said at least one mode locked laser; and an optical delivery fiber configured such that at each of said wavelengths, $\lambda_1 \ldots \lambda_n$, net dispersion exhibited by said at least one mode locked laser, said dispersive optical components and said optical delivery fiber substantially compensates a net dispersion of an end use device disposed downstream from said laser system, said end use device configured to irradiate a sample with ultrashort pulses, wherein said end use device is configured to deliver femtosecond pulses having a selected plurality of said output wavelengths $\lambda_1 \ldots \lambda_n$, to said sample, each of said femtosecond pulses substantially compensated for the net dispersion of said laser system and said end use device.

2. The laser system according to claim 1, wherein said at least one mode locked laser comprises at least one mode locked fiber oscillator.

3. The laser system according to claim 2, wherein said at least one mode locked fiber oscillator comprises one or more of an Nd fiber oscillator, a Yb fiber oscillator, an Er fiber oscillator, a Tm fiber oscillator, or a Ho fiber oscillator.

4. The laser system according to claim 2, wherein said at least one mode locked fiber oscillator generates input pulses having one or more wavelengths of said plurality of output wavelengths, $\lambda_1 \ldots \lambda_n$.

5. The laser system according to claim 1, further comprising an optical modulator receiving pulses at said plurality of wavelengths, said modulator configured to controllably select one or more pulses at said plurality of wavelengths and/or to control the output power at said wavelengths.

6. The laser system according to claim 5, wherein said optical modulator comprises an acousto-optic modulator, an electro-optic modulator, or an integrated Mach Zehnder modulator.

7. The laser system according to claim 1, further comprising a controller in communication with said end use device.

8. The laser system according to claim 1, wherein said optical delivery fiber is configured with pre-selected dispersion at multiple wavelengths of said plurality of output wavelengths, $\lambda_1 \ldots \lambda_n$.

9. The laser system according to claim 1, wherein n=2, and said wavelengths are approximately 920 nm and 1060 nm.

10. The laser system according to claim 1, wherein n=3, and said wavelengths are approximately 920 nm, 1060 nm, and 1300 nm.

11. The laser system according to claim 1, wherein n=3, and said wavelengths are approximately 780 nm, 940 nm and 1050 nm or approximately 780 nm, 950 nm and 1320 nm.

12. The laser system according to claim 1, wherein said system comprises a Raman shifting fiber configured for Raman soliton propagation.

13. The laser system according to claim 12, wherein said Raman shifting fiber shifts an input wavelength to one or more of the plurality of output wavelengths $\lambda_1 \ldots \lambda_n$.

14. The laser system according to claim 12, wherein said Raman shifting fiber produces an output wavelength of about 2600 nm, and said system comprises a frequency doubler to generate 1300 nm optical pulses.

15. The laser system according to claim 1, wherein said system comprises a frequency converter configured for upconverting a frequency of optical pulses.

16. The laser system according to claim 1, wherein said system comprises a crystal for difference frequency generation (DFG), and an output from said DFG comprises one of more of the wavelengths $\lambda_1 \ldots \lambda_n$.

17. The laser system according to claim 1, wherein said optical delivery fiber comprises a hollow core photonic crystal fiber (HC-PCF), a hollow core photonic bandgap fiber (HC-PBGF), or a Kagome fiber.

18. The laser system according to claim 1, wherein said optical delivery fiber exhibits slightly anomalous dispersion at one or more output wavelengths, $\lambda_1 \ldots \lambda_n$.

19. The laser system according to claim 1, wherein said ultrashort pulses irradiating said sample are nearly transform limited, and comprise pulse widths in the range from about 100 fs to about 1 ps with pulse pedestal substantially below 10% of a peak value of the ultrashort pulses.

20. The laser system according to claim 1, wherein said dispersive components disposed downstream from said at least one mode locked laser comprise specialty fiber arranged to pre-chirp an input signal and vary a pulse width of said input signal via normal or anomalous dispersion.

21. The laser system according to claim 1, wherein $\lambda_1 \ldots \lambda_n$ comprises a wavelength at or near 920 nm.

22. The laser system according to claim 1, said wavelength comprising, as $\lambda_1$, the 900 to 950 nm wavelength range and, as $\lambda_2$, the 1030 to 1080 nm wavelength range, wherein said system configured with a single Nd power amplifier simultaneously amplifying optical pulses having respective wavelengths in each of the two wavelength ranges $\lambda_1$ and $\lambda_2$.

23. The laser system according to claim 1, further comprising: an optical parametric amplifier (OPA) disposed between said at least one mode locked laser and said optical delivery fiber, wherein said OPA generates a plurality of OPA output wavelengths, n>2, for use in said end use device, and wherein said optical delivery fiber is configured with dispersion at each of said OPA wavelengths such that compressed optical pulses having pulse widths less than about 200 fs are provided from said end use device to irradiate said sample.

24. An end use device utilizing ultrashort pulses to irradiate a sample, the end use device comprising:
the laser system according to claim 1; and
delivery and focusing optics having predetermined net dispersion at each of a plurality of wavelengths, $\lambda_1 \ldots \lambda_n$, wherein n≥2,
wherein the net dispersion in each of said laser system and said end use device at each of said wavelengths $\lambda_1 \ldots \lambda_n$ is sufficiently compensated to result in nearly transform limited ultrashort pulses having pulse widths in the range from about 100 fs to about 1 ps.

25. A laser system configured to generate ultrashort pulses to irradiate a sample, comprising:
a mode locked laser configured to generate input pulses;
a highly nonlinear fiber configured to generate a frequency broadened spectrum downstream of said mode locked laser, said broadened spectrum overlapping at least partially with a signal wavelength range $\Delta\lambda$,
dispersive optical components disposed downstream from said mode locked laser;
an optical parametric amplifier (OPA) disposed downstream from said mode locked laser, said OPA configured to amplify optical pulses with a corresponding pulse spectrum within the wavelength range $\Delta\lambda$; and an optical delivery fiber configured such that within said wavelength range Δλ, the net dispersion exhibited by said mode locked laser, said dispersive optical components, said OPA, and said optical delivery fiber substantially compensates a net dispersion of an end use apparatus disposed downstream from said laser system, said end use apparatus configured to irradiate a sample with femtosecond pulses generated with said OPA.

\* \* \* \* \*